(12) United States Patent
Jung et al.

(10) Patent No.: US 11,522,452 B2
(45) Date of Patent: Dec. 6, 2022

(54) BUCK CONVERTER

(71) Applicant: QUALCOMM Incorporated, San Diego, CA (US)

(72) Inventors: Sanghwa Jung, Los Gatos, CA (US); Xiaolin Gao, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 405 days.

(21) Appl. No.: 16/721,737

(22) Filed: Dec. 19, 2019

(65) Prior Publication Data
US 2021/0194364 A1 Jun. 24, 2021

(51) Int. Cl.
*H02M 3/158* (2006.01)
*H02J 7/00* (2006.01)

(52) U.S. Cl.
CPC ............ *H02M 3/158* (2013.01); *H02J 7/007* (2013.01); *H02J 2207/20* (2020.01)

(58) Field of Classification Search
CPC .... H02M 3/158; H02M 1/0095; H02M 3/072; H02M 3/07; H02J 7/007; H02J 2207/20
See application file for complete search history.

(56) References Cited

U.S. PATENT DOCUMENTS

| 11,303,220 B2* | 4/2022 | Oi ......................... H02M 7/483 |
| 2016/0344214 A1 | 11/2016 | Petersen et al. | |
| 2017/0201177 A1* | 7/2017 | Kesarwani ............. H02M 1/14 |
| 2018/0123451 A1* | 5/2018 | Larsen ................... H02M 1/14 |
| 2018/0337545 A1* | 11/2018 | Crosby ................. H02M 3/158 |
| 2019/0273436 A1* | 9/2019 | Tang ..................... H02M 3/158 |
| 2021/0111643 A1* | 4/2021 | Hsin ...................... H02M 1/32 |
| 2021/0194364 A1* | 6/2021 | Jung ...................... H02M 3/07 |

OTHER PUBLICATIONS

International Search Report and Written Opinion—PCT/US2020/064416—ISA/EPO—dated Mar. 25, 2021.
Texas Instruments: "bq25910 I²C Controlled 6-A Three-Level Switch Mode, Single-Cell Parallel Battery Charger for Fast Charging", SLVSDU0A Sep. 2017—Revised Feb. 2018, 61 pages.
Texas Instruments: "bq25970, bq25971 I²C Controlled Single Cell High Efficiency 8-A Switched Cap Fast Chargers With ADC", SLUSD72A—Nov. 2017—Revised Dec. 2017, 13 pages.

* cited by examiner

*Primary Examiner* — Nha T Nguyen
(74) *Attorney, Agent, or Firm* — Loza & Loza, LLP

(57) ABSTRACT

A method of operating a buck converter is disclosed. The buck converter includes a first capacitor, a second capacitor, and an inductor between a node and an output of the buck converter. The method includes, during a first portion of a cycle, coupling the first capacitor and the second capacitor in series between an input of the buck converter and a ground, wherein the first capacitor is coupled between the input of the buck converter and the node, and the second capacitor is coupled between the node and the ground. The method also includes, during a second portion of the cycle, coupling the second capacitor and the first capacitor in series between the input of the buck converter and the ground, wherein the second capacitor is coupled between the input of the buck converter and the node, and the first capacitor is coupled between the node and the ground.

20 Claims, 29 Drawing Sheets

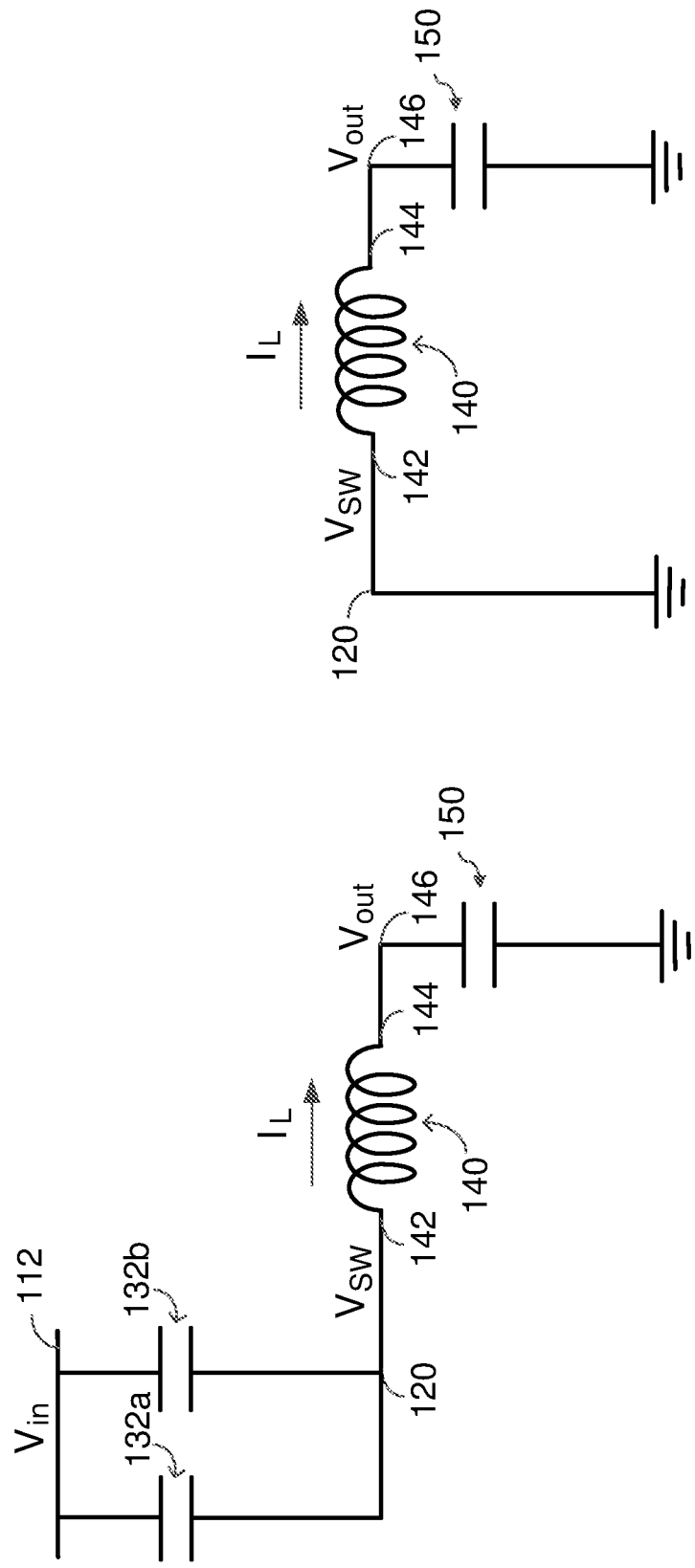

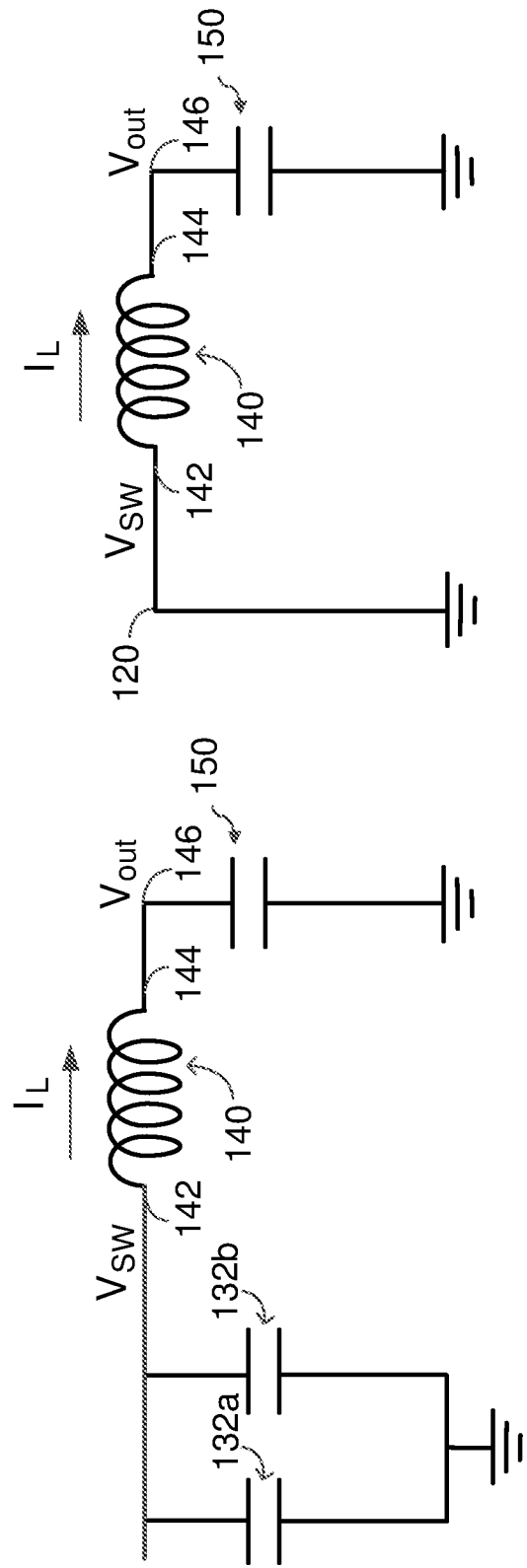

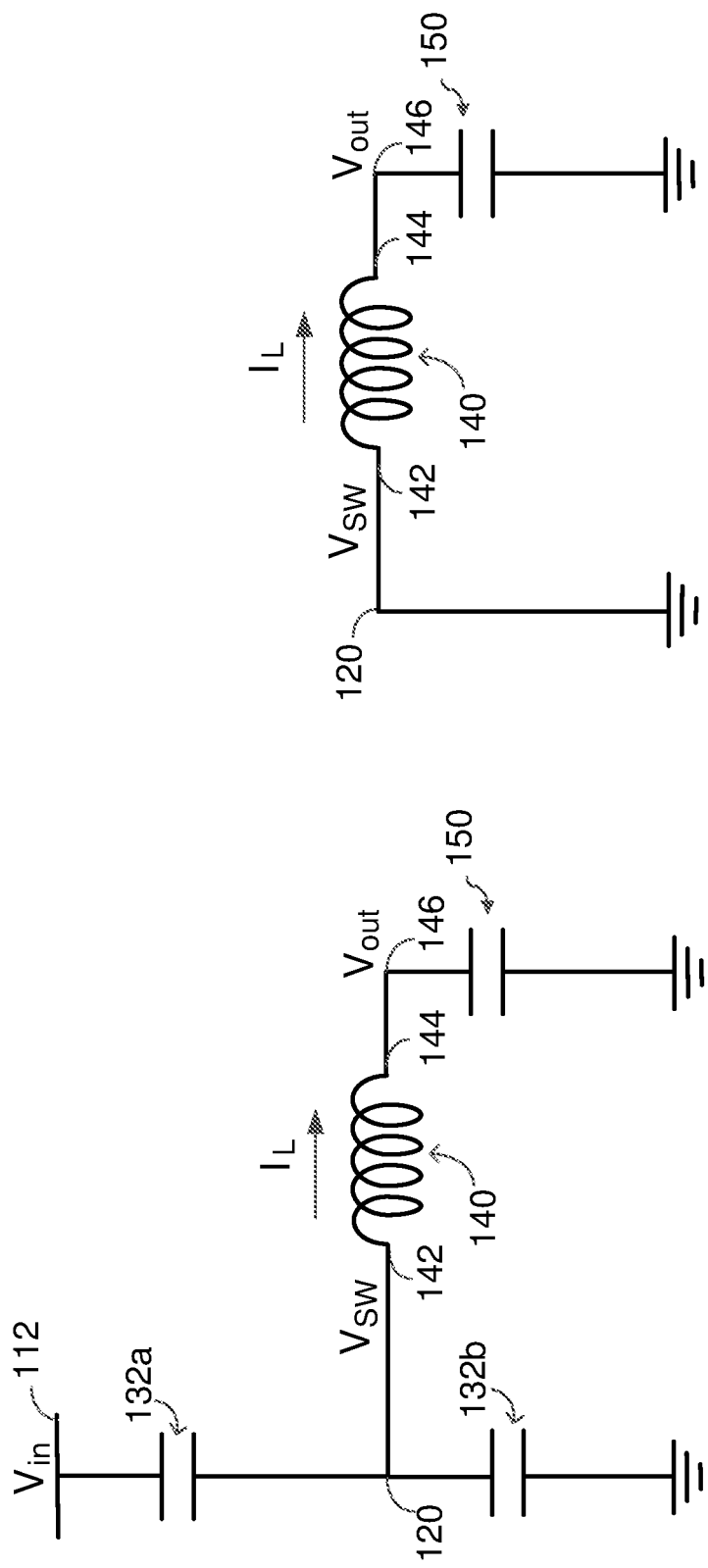

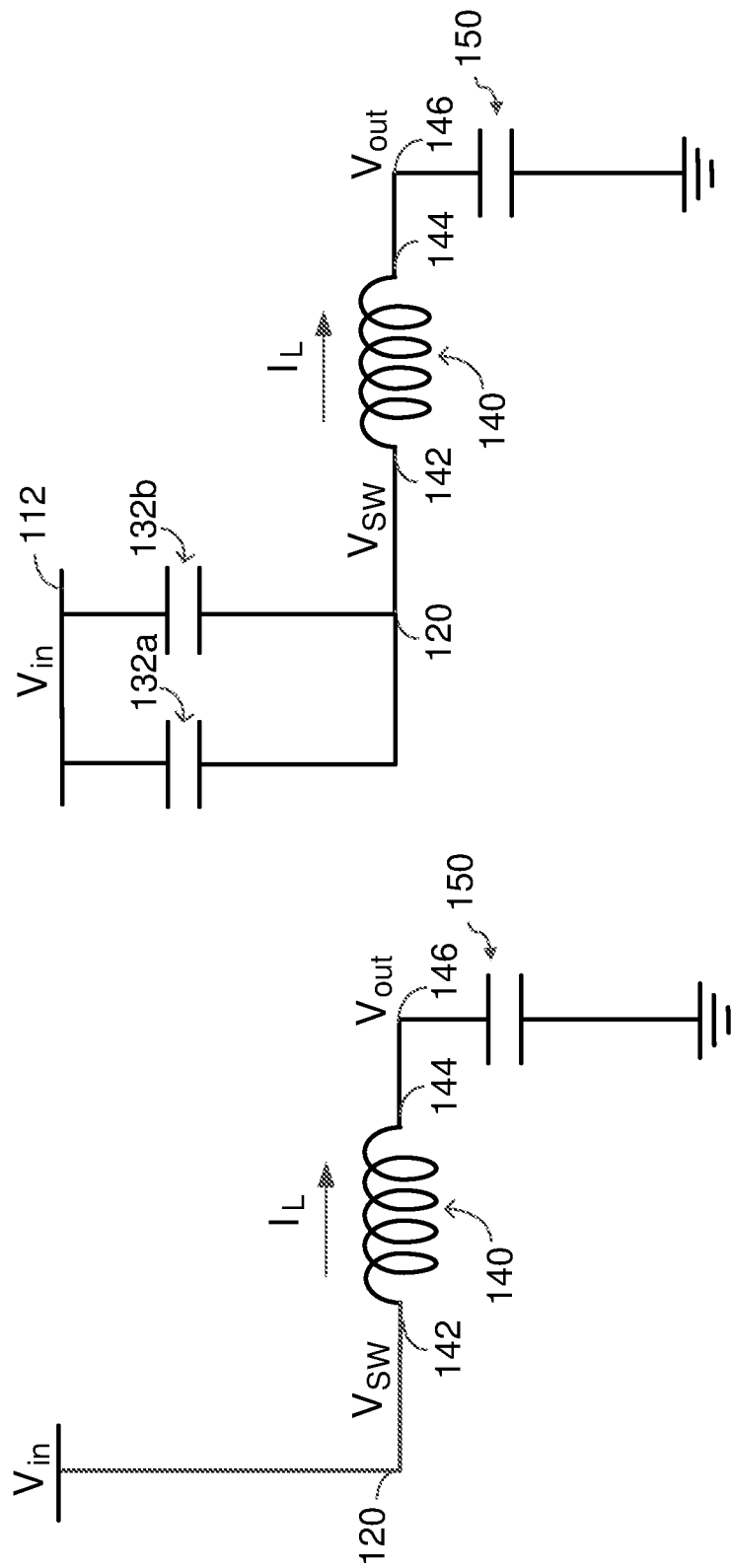

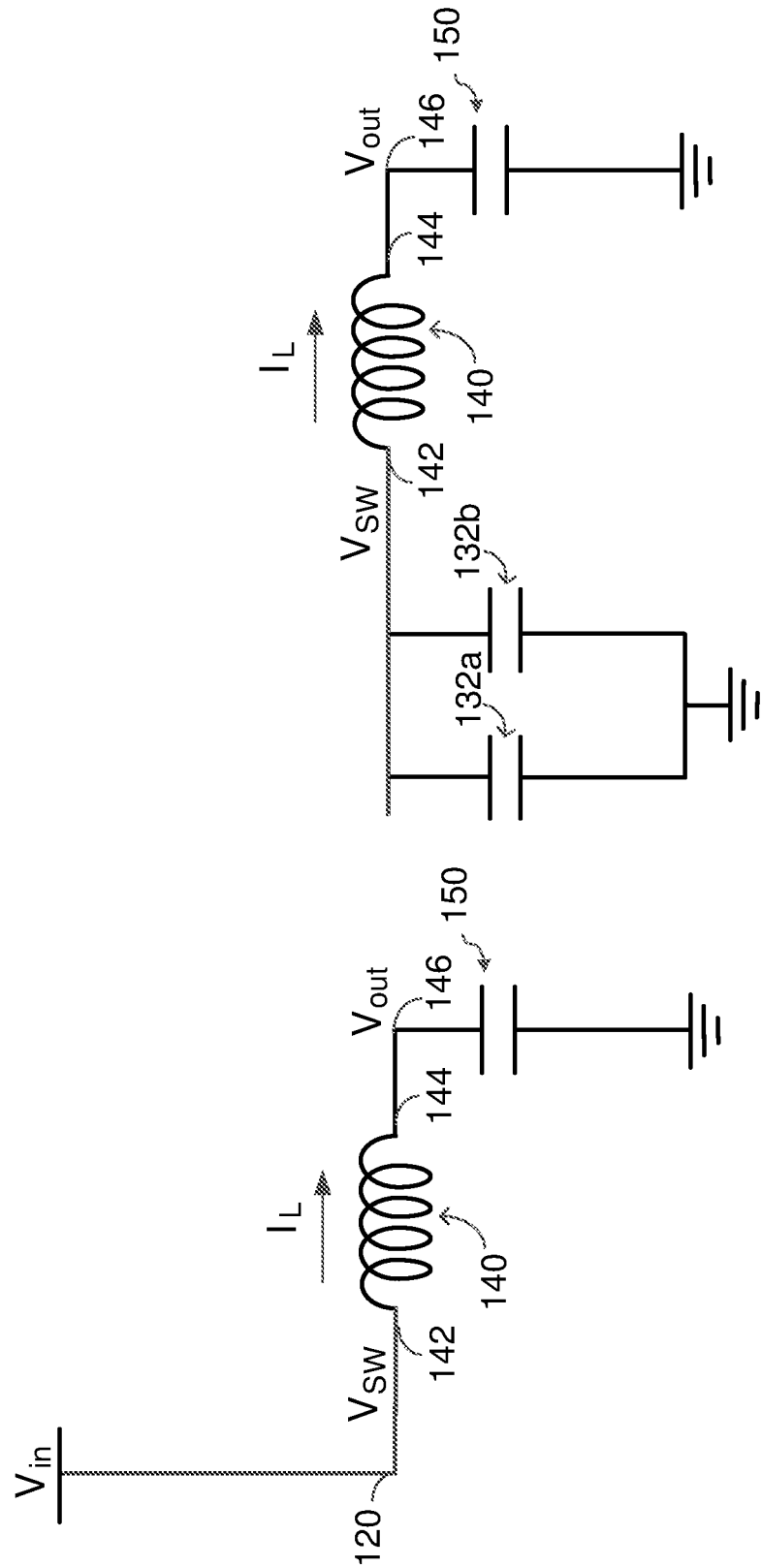

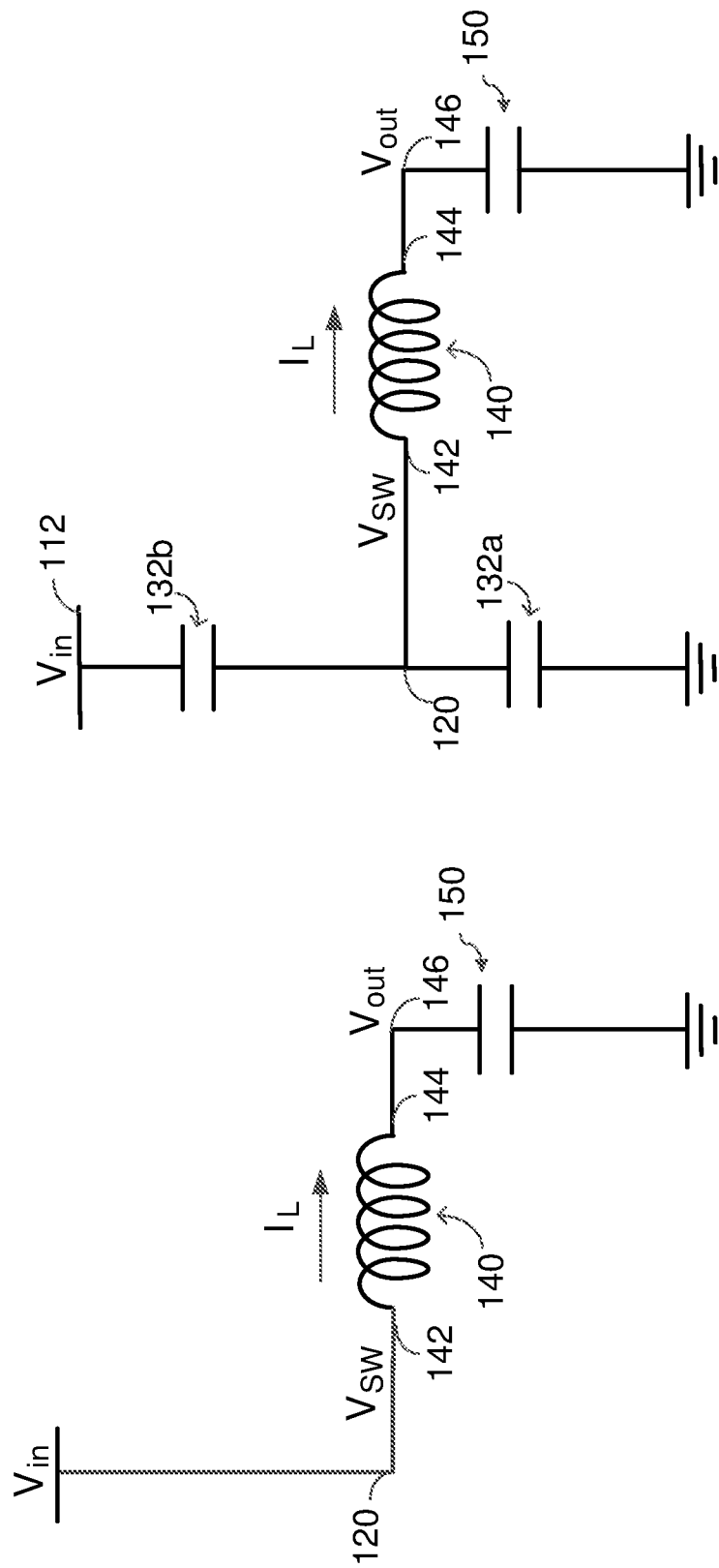

BUCK CONVERTER

BACKGROUND

Field

Aspects of the present disclosure relate generally to power converters, and more particularly, to buck converters.

Background

A buck converter is a power converter used to step down (i.e., down convert) a voltage.

For example, a buck converter may be used in a mobile device to step down a voltage from a power source (e.g., a universal serial bus (USB) power source, a wireless charger, etc.) to a lower voltage to charge a battery in the mobile device.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a method of operating a buck converter. The buck converter includes a first capacitor, a second capacitor, and an inductor coupled between a node and an output of the buck converter. The method includes, during a first portion of a first cycle, coupling the first capacitor and the second capacitor in series between an input of the buck converter and a ground, wherein the first capacitor is coupled between the input of the buck converter and the node, and the second capacitor is coupled between the node and the ground. The method also includes, during a second portion of the first cycle, coupling the second capacitor and the first capacitor in series between the input of the buck converter and the ground, wherein the second capacitor is coupled between the input of the buck converter and the node, and the first capacitor is coupled between the node and the ground.

A second aspect relates to an apparatus. The apparatus includes a buck converter and a controller. The buck converter includes a first capacitor, and a first switching network configured to couple the first capacitor between an input of the buck converter and a node in response to a first set of control values, and to couple the first capacitor between the node and a ground in response to a second set of control values. The buck converter also includes a second capacitor, and a second switching network configured to couple the second capacitor between the input of the buck converter and the node in response to a third set of control values, and to couple the second capacitor between the node and the ground in response to a fourth set of control values. The buck converter further includes an inductor coupled between the node and an output of the buck converter. During a first portion of a first cycle, the controller is configured to input the first set of control values to the first switching network and input the fourth set of control values to the second switching network, and, during a second portion of the first cycle, the controller is configured to input the second set of control values to the first switching network and input the third set of control values to the second switching network.

A third aspect relates to an apparatus. The apparatus includes a buck converter, a control signal generator, and a swap circuit. The buck converter includes a first control input and a second control input. The control signal generator includes a first output and a second output, and the control signal generator is configured to generate a first control signal and a second control signal for controlling switching in the buck converter, output the first control signal at the first output, and output the second control signal at the second output. In a first mode, the swap circuit is configured to couple the first output to the first control input and couple the second output to the second control input, and, in a second mode, the swap circuit is configured to couple the first output to the second control input and couple the second output to the first control input.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

BRIEF DESCRIPTION OF THE DRAWINGS

FIG. 3A shows an exemplary configuration of a buck converter during a first phase of a cycle for the case of in-phase operation and a duty cycle of less than 50% according to certain aspects of the present disclosure.

FIG. 3B shows an exemplary configuration of the buck converter during a second phase of the cycle according to certain aspects of the present disclosure.

FIG. 3C shows an exemplary configuration of the buck converter during a third phase of the cycle according to certain aspects of the present disclosure.

FIG. 3D shows an exemplary configuration of the buck converter during a fourth phase of the cycle according to certain aspects of the present disclosure.

FIG. 5A shows an exemplary configuration of a buck converter during a first phase of a cycle for the case of out-of-phase operation and a duty cycle of less than 50% according to certain aspects of the present disclosure.

FIG. 5B shows an exemplary configuration of the buck converter during a second phase of the cycle according to certain aspects of the present disclosure.

FIG. 7A shows an exemplary configuration of a buck converter during a first phase of a cycle for the case of in-phase operation and a duty cycle greater than 50% according to certain aspects of the present disclosure.

FIG. 7B shows an exemplary configuration of the buck converter during a second phase of the cycle according to certain aspects of the present disclosure.

FIG. 7C shows an exemplary configuration of the buck converter during a third phase of the cycle according to certain aspects of the present disclosure.

FIG. 7D shows an exemplary configuration of the buck converter during a fourth phase of the cycle according to certain aspects of the present disclosure.

FIG. 9C shows an exemplary configuration of the buck converter during a third phase of the cycle according to certain aspects of the present disclosure.

FIG. 9D shows an exemplary configuration of the buck converter during a fourth phase of the cycle according to certain aspects of the present disclosure.

DETAILED DESCRIPTION

Figure 1:
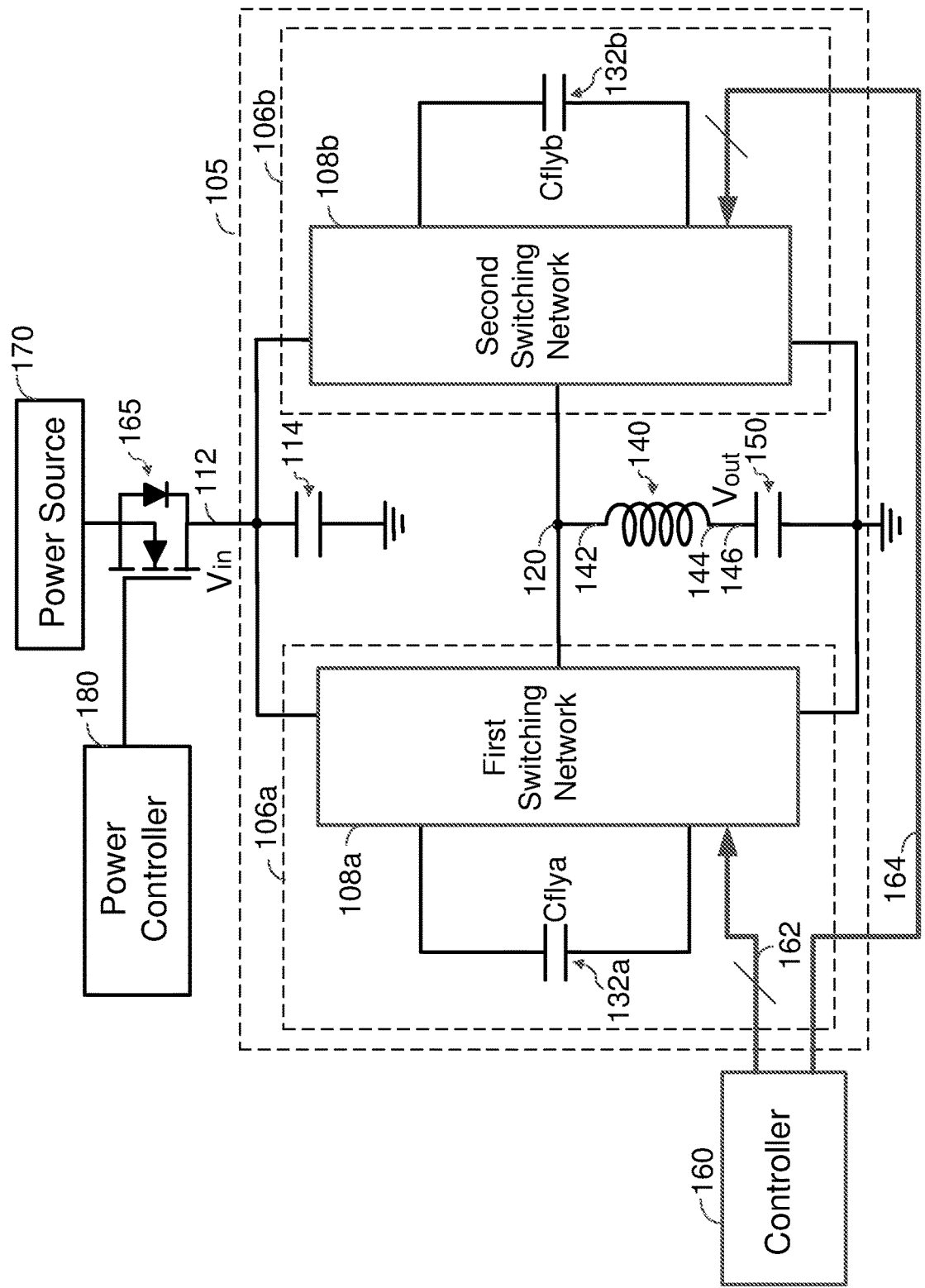
FIG. 1 shows an example of a buck converter according to certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A buck converter is a power converter used to step down (i.e., down convert) an input voltage to a lower output voltage. One type of buck converter is a two-level buck converter. A two-level buck converter may include a switching network and an inductor, in which the inductor is coupled between a switch node of the switching network and the output of the buck converter. During operation, the switching network switches the switch node between the input voltage and ground, which causes the inductor to be energized and deenergized in cycles. The output voltage of the two-level buck converter is controlled by controlling the duty cycle of the switching network.

Another type of buck converter is a three-level buck converter, which is able to achieve higher power efficiency and lower inductor ripple current compared with the two-level buck converter. The three-level buck converter may include a switching network, a fly capacitor, and an inductor. The inductor is coupled between a switch node of the switching network and the output of the three-level buck converter, and the voltage of the fly capacitor is maintained at approximately half the input voltage. The fly capacitor allows the switching network to set the voltage at the switch node to one of three voltage levels: the input voltage, half the input voltage, and ground. In operation, the switching network switches the switch node between half the input voltage and ground for the case where the duty cycle is less than 50% and the output voltage is set to a voltage level between ground and half the input voltage. The switching network switches the switch node between the input voltage and half the input voltage for the case where the duty cycle is greater than 50% and the output voltage is set to a voltage level between half the input voltage and the input voltage.

Thus, for the case where the duty cycle is less than 50%, the voltage at the switch node swings between half the input voltage and ground, and, for the case where the duty cycle is greater than 50%, the voltage at the switch node swings between the input voltage and half the input voltage. In both cases, the voltage swing at the switch node of the three-level buck converter is approximately equal to half the input voltage. In contrast, the voltage swing at the switch node of the two-level buck converter is equal to the input voltage since the switch node of the two-level buck converter swings between the input voltage and ground. Thus, using the three-level buck converter reduces the voltage swing at the switch node by half compared with the two-level buck converter. The smaller voltage swing at the switch node of the three-level buck converter helps reduce the inductor ripple current of the three-level buck converter compared with the two-level buck converter, resulting in an improvement in power efficiency (e.g., 5% improvement in power efficiency).

FIG. 1 shows an example of a dual branch three-level buck converter 105 according to aspects of the present disclosure. In this example, the input 112 of the buck converter 105 is selectively coupled to a power source 170 by a power transistor 165. The power source 170 may include a USB power source, a wireless charger, or another power source. The power transistor 165 is coupled between the power source 170 and the input 112 of the buck converter 105, and may include a p-type field effect transistor (PFET), an n-type-field effect transistor (NFET), or another type of transistor.

A power controller 180 is configured to control power to the buck converter 105 by controlling the on/off state of the power transistor 165. To power the buck converter 105, the power controller 180 turns on the power transistor 165, which allows current to flow from the power source 170 to the buck converter 105 through the power transistor 165. To power off the buck converter 105, the power controller 180 turns off the power transistor 165.

In the example in FIG. 1, the buck converter 105 includes a first branch 106a, a second branch 106b, an inductor 140, an input capacitor 114, and an output capacitor 150. In the discussion below, reference numbers for the elements of the first branch 106a include the suffix "a" and reference numbers for the elements of the second branch 106b include the suffix "b."

The first branch 106a includes a first switching network 108a and a first fly capacitor 132a. The first switching network 108a is configured to couple the first fly capacitor 132a between the input 112 of the buck converter 105 and a switch node 120 in response to a first set of control values, and to couple the first fly capacitor 132a between the switch node 120 and ground in response to a second set of control values. In FIG. 1, the first fly capacitor 132a is labeled "Cflya."

The second branch 106b includes a second switching network 108b and a second fly capacitor 132b. The second switching network 108b is configured to couple the second fly capacitor 132b between the input 112 of the buck converter 105 and the switch node 120 in response to a third set of control values, and to couple the second fly capacitor 132b between the switch node 120 and ground in response to a fourth set of control values. In FIG. 1, the second fly capacitor 132b is labeled "Cflyb."

The first switching network 108a may also be configured to couple the switch node 120 to ground in response to a fifth set of control values, and the second switching network 108b may also be configured to couple the switch node 120 to ground in response to a sixth set of control values. Each control value in a set of control values may control a respective switch in one of the switching networks 108a and 108b, as discussed further below. In some implementations, the second switching network 108b may have the same structure or substantially the same structure as the first switching network 108a, in which case, the first, second and fifth sets of control values may be the same as the third, fourth and sixth sets of control values, respectively.

The input capacitor 114 is coupled between the input 112 of the buck converter 105 and ground, and is used to smooth out the input voltage $V_{in}$. A first terminal 142 of the inductor 140 is coupled to the switch node 120, and a second terminal 144 of the inductor 140 is coupled to the output 146 of the buck converter 105. The output capacitor 150 is coupled between the output 146 of the buck converter 105 and ground, and is used to smooth out the output voltage $V_{out}$ of the buck converter 105. The output 146 of the buck converter 105 may be coupled to a load (not shown in FIG. 1). The load may include a battery for the example in which the buck converter 105 is used for battery charging.

A controller 160 controls switching of the first switching network 108a by inputting a set of control values (e.g., one of the first, second and fifth sets of control signals) to the first switching network 108a via control path 162. The controller 160 controls switching of the second switching network 108b by inputting a set of control values (e.g., one of the third, fourth and sixth sets of control signals) to the second switching network 108b via control path 164. For example, to couple the first fly capacitor 132a between the input 112 and the switch node 120, the controller 160 may input the first set of control signals to the first switching network 108a via control path 162, and, to couple the second fly capacitor 132b between the input 112 and the switch node 120, the controller 160 may input the third of control signals to the second switching network 108b via control path 164. Each of the control paths 162 and 164 may include multiple control lines (e.g., one control line for each control value in a set of control values).

During operation, the controller 160 controls switching of the first and second switching networks 108a and 108b in cycles to step down an input voltage $V_{in}$ at the input 112 of the buck converter 105 to a lower output voltage $V_{out}$ at the output 146 of the buck converter 105. Each cycle of the buck converter 105 may include a first phase (labeled "Phase I"), a second phase (labeled "Phase II"), a third phase (labeled "Phase III"), and a fourth phase (labeled "Phase IV"). In certain aspects, the voltage across each of the first and second fly capacitors 132a and 132b is maintained at approximately half the input voltage $V_{in}/2$.

Figure 2:
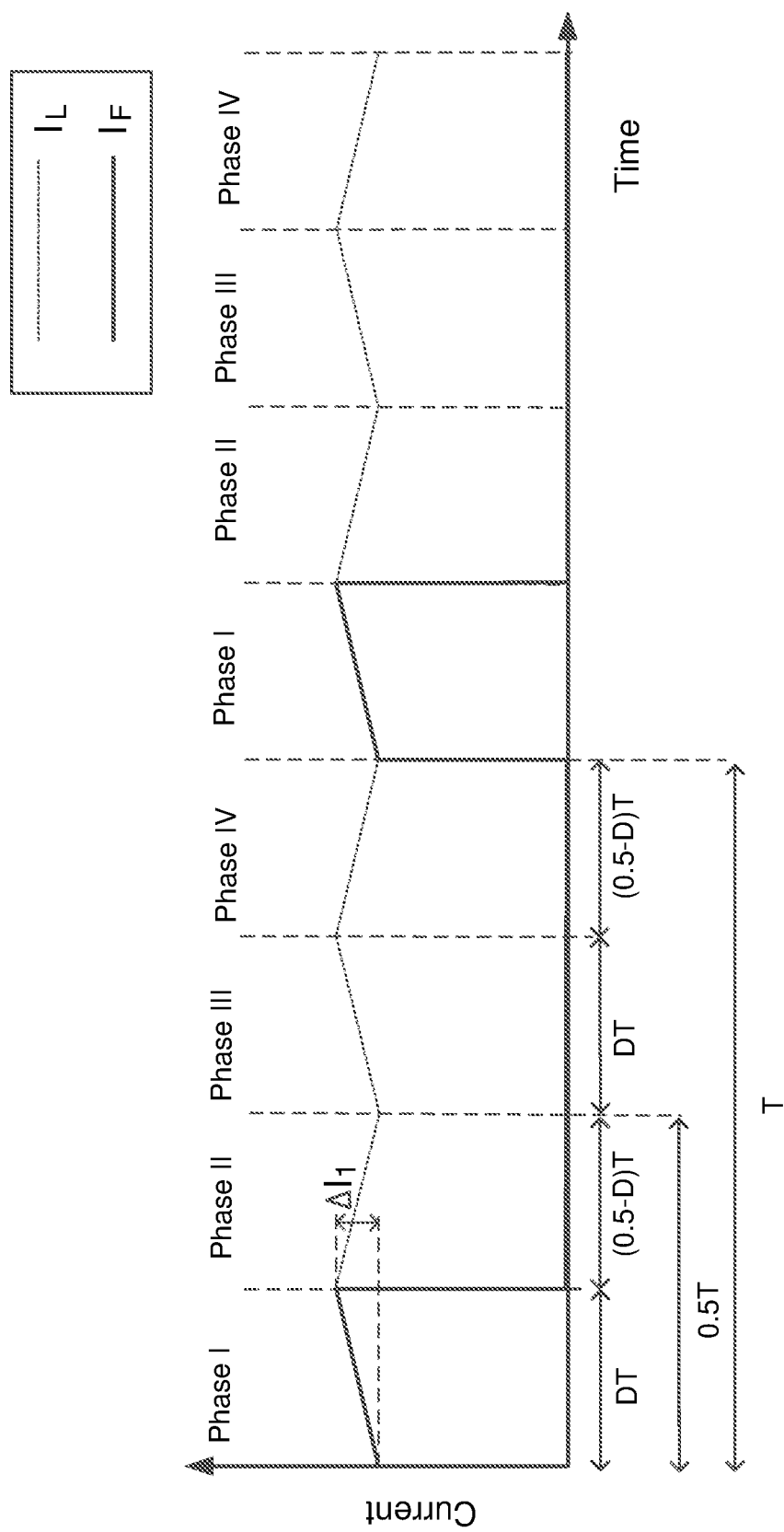
FIG. 2 shows exemplary waveforms for a buck converter for the case of in-phase operation and a duty cycle of less than 50% according to certain aspects of the present disclosure.

In certain aspects, the controller 160 may operate the first and second branches 106a and 106b of the buck converter 105 in-phase. In this regard, an example of in-phase operation of the buck converter 105 will now be discussed with reference to FIG. 2 and FIGS. 3A to 3D for the case where the duty cycle of the buck converter 105 is less than 50% and the output voltage $V_{out}$ is between ground and $V_{in}/2$. FIG. 2 shows an example of the power transistor current $I_F$ and the inductor current $I_L$ over two cycles during in-phase operation. The power transistor current $I_F$ is input to the buck converter 105 at the input 112 and may represent current drawn from the power source 170 to the buck converter 105 through the power transistor 165. FIGS. 3A to 3D illustrate exemplary configurations of the buck converter 105 during the different phases of a cycle for in-phase operation.

During the first phase of a cycle, the controller 160 causes the first and second switching networks 108a and 108b to couple the first and second fly capacitors 132a and 132b in parallel between the input 112 of the buck converter 105 and the switch node 120. An example of this is illustrated in FIG. 3A, which shows an equivalent circuit of the buck converter 105 during the first phase. The controller 160 may couple the first fly capacitor 132a between the input 112 and the switch node 120 by inputting the first set of control values to the first switching network 108a, and couple the second fly capacitor 132b between the input 112 and the switch node 120 by inputting the third set of control values to the second switching network 108b.

During the first phase, the voltage $V_{SW}$ at the switch node 120 is approximately equal to the input voltage $V_{in}$ minus the voltage across the first and second fly capacitors 132a and 132b, which are coupled in parallel. Since the voltage across the first and second fly capacitors 132a and 132b is approximately equal to $V_{in}/2$, the voltage $V_{SW}$ at the switch node 120 is approximately equal to $V_{in}/2$ during the first phase. Because the switch node voltage of $V_{in}/2$ is greater than the output voltage $V_{out}$ for the case where the duty cycle is less than 50%, the inductor 140 is energized during the first phase, which causes the inductor current $I_L$ to increase (e.g., ramp up), as shown in FIG. 2. The duration of the first phase is equal to DT where D is the duty cycle of the buck converter 105 and T is the period (i.e., time duration) of one cycle. Also, during the first phase, the buck converter 105 draws current $I_F$ from the power source 170 through the power transistor 165 to charge the first and second fly capacitors 132a and 132b, as shown in FIG. 2.

During the second phase of the cycle, the controller 160 causes the first and second switching networks 108a and 108b to couple the switch node 120 to ground. An example of this is illustrated in FIG. 3B, which shows an equivalent circuit of the buck converter 105 during the second phase. The controller 160 may couple the switch node 120 to ground by inputting the fifth set of control signals to the first switching network 108a, and inputting the sixth set of control signals to the second switching network 108b. During the second phase, the inductor 140 is deenergized, which causes the inductor current $I_L$ to decrease (e.g., ramp down), as shown in FIG. 2. The duration of the second phase is equal to (0.5-D)T. Also, during the second phase, the power transistor current $I_F$ is approximately zero since the switch node 120 and the fly capacitors 132a and 132b are decoupled from the input 112.

During the third phase of the cycle, the controller 160 causes the first and second switching networks 108a and 108b to couple the first and second fly capacitors 132a and 132b in parallel between the switch node 120 and ground. An example of this is illustrated in FIG. 3C, which shows an equivalent circuit of the buck converter 105 during the third phase. The controller 160 may couple the first fly capacitor 132a between the switch node 120 and ground by inputting the second set of control signals to the first switching network 108a, and inputting the fourth set of control signals to the second switching network 108b.

During the third phase, the voltage $V_{SW}$ at the switch node 120 is approximately equal to the voltage across the first and second fly capacitors 132a and 132b, which is approximately equal to $V_{in}/2$. Because the switch node voltage of $V_{in}/2$ is greater than the output voltage $V_{out}$ for the case where the duty cycle is less than 50%, the inductor 140 is energized during the third phase, which causes the inductor current $I_L$ to increase (e.g., ramp up). The duration of the third phase is equal to DT. Also, during the third phase, the power transistor current $I_F$ is approximately zero since the switch node 120 and the fly capacitors 132a and 132b are decoupled from the input 112.

During the fourth phase of the cycle, the controller 160 causes the first and second switching networks 108a and 108b to couple the switch node 120 to ground. An example of this is illustrated in FIG. 3D, which shows an equivalent circuit of the buck converter 105 during the fourth phase. During the fourth phase, the inductor 140 is deenergized, which causes the inductor current $I_L$ to decrease (e.g., ramp down). The duration of the fourth phase is equal to (0.5-D)T. Also, during the fourth phase, the power transistor current $I_F$ is approximately zero since the switch node 120 and the fly capacitors 132a and 132b are decoupled from the input 112. Note that, in this example, the configuration of the buck converter 105 in the fourth phase is the same as the configuration of the buck converter 105 in the second phase.

As shown in FIG. 2, during in-phase operation, the buck converter 105 draws current through the power transistor 165 during the first phase of each cycle. During the second, third and fourth phases of each cycle, the power transistor current $I_F$ is approximately zero. Because the buck converter 105 draws current through the power transistor 165 during one phase (i.e., the first phase) of each cycle, the ripple current of the power transistor 165 may be relatively high. The high ripple current of the power transistor 165 increases the power loss in the power transistor 165, which lowers power efficiency. In addition, the high ripple current may require that the capacitance of the input capacitor 114 be increased to smooth out the input voltage $V_{in}$, which increases the area of the input capacitor 114.

To address this, aspects of the present disclosure operate the first and second branches 106a and 106b of the buck converter 105 out-of-phase. As discussed further below, out-of-phase operation reduces the ripple current of the power transistor 165 by spreading out the current drawn through the power transistor 165 (e.g., over two phases of each cycle instead of one phase of each cycle). The lower ripple current reduces power loss in the power transistor 165 thereby improving power efficiency. In addition, the lower ripple current reduces the capacitance requirement for the input capacitor 114, allowing the use of a smaller input capacitor 114.

Figure 4:
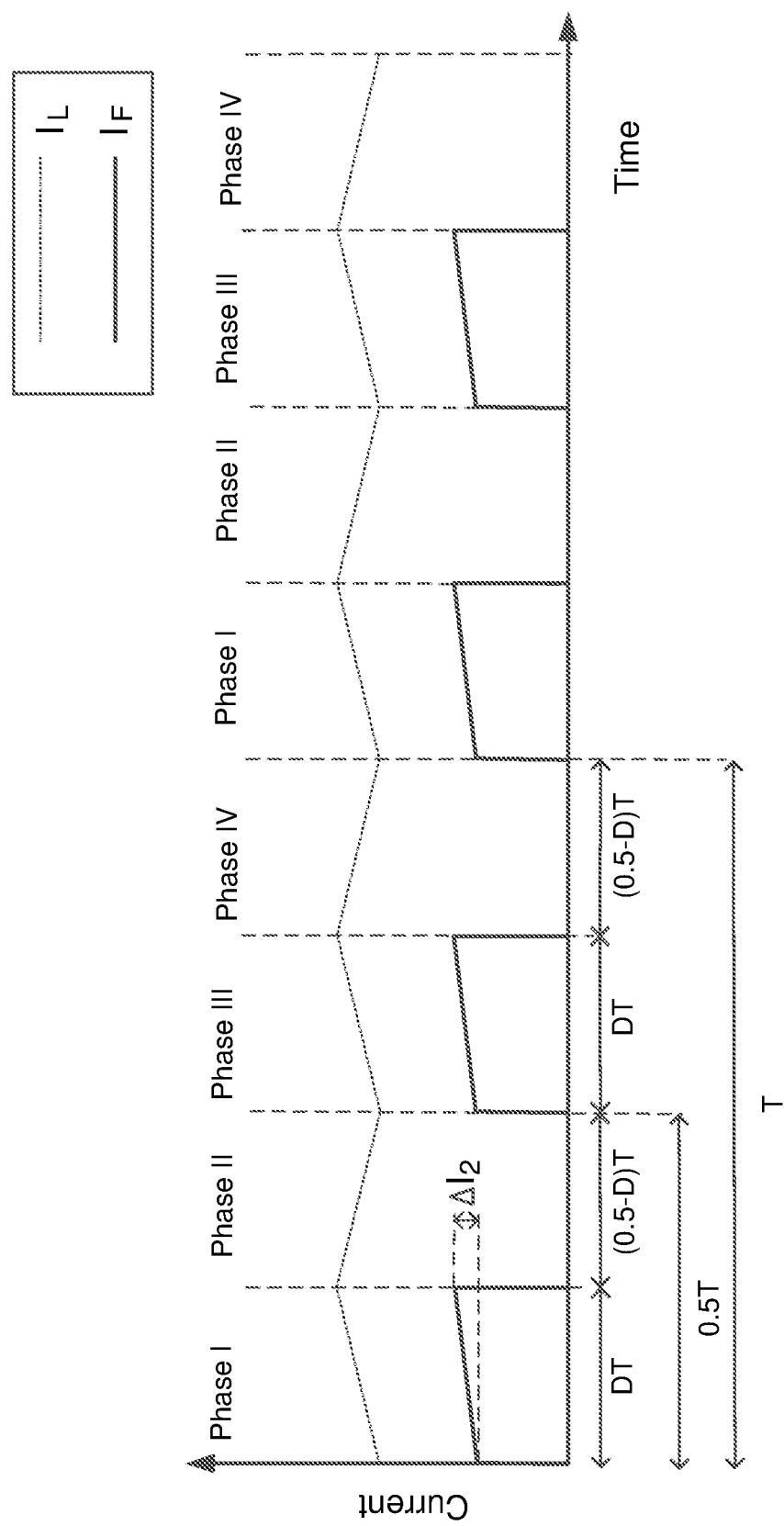
FIG. 4 shows exemplary waveforms for a buck converter for the case of out-of-phase operation and a duty cycle of less than 50% according to certain aspects of the present disclosure.

An example of out-of-phase operation of the buck converter 105 will now be discussed with reference to FIG. 4 and FIGS. 5A to 5D for the case where the duty cycle of the buck converter 105 is less than 50% and the output voltage $V_{out}$ is between ground and $V_{in}/2$. FIG. 4 shows an example of the power transistor current $I_F$ and the inductor current $I_L$ over two cycles during out-of-phase operation. FIGS. 5A to 5D illustrate exemplary configurations of the buck converter 105 during the different phases of a cycle for out-of-phase operation.

During the first phase of a cycle, the controller 160 causes the first and second switching networks 108a and 108b to couple the first fly capacitor 132a and the second fly capacitor 132b in series between the input 112 of the buck converter 105 and ground, in which the first fly capacitor 132a is coupled between the input 112 and the switch node 120, and the second fly capacitor 132b is coupled between the switch node 120 and ground. An example of this is illustrated in FIG. 5A, which shows an equivalent circuit of the buck converter 105 during the first phase. The controller 160 may couple the first fly capacitor 132a between the input 112 and the switch node 120 by inputting the first set of control signals to the first switching network 108a, and couple the second fly capacitor 132b between the switch node 120 and ground by inputting the fourth set of control signals to the first switching network 108a.

During the first phase, the voltage $V_{SW}$ at the switch node 120 is approximately equal to $V_{in}/2$. This is because the voltage across each of the first and second fly capacitors 132a and 132b is approximately equal to $V_{in}/2$, and the switch node 120 is between the first fly capacitor 132a and the second fly capacitor 132b. Since the switch node voltage of $V_{in}/2$ is greater than the output voltage $V_{out}$ for the case where the duty cycle is less than 50%, the inductor 140 is energized during the first phase, which causes the inductor current $I_L$ to increase (e.g., ramp up), as shown in FIG. 4. The duration of the first phase is equal to DT. Also, during the first phase, the buck converter 106 draws current $I_F$ from the power source 170 through the power transistor 165 to charge the first fly capacitors 132a.

During the second phase of the cycle, the controller 160 causes the first and second switching networks 108a and 108b to couple the switch node 120 to ground. An example of this is illustrated in FIG. 5B, which shows an equivalent circuit of the buck converter 105 during the second phase. The controller 160 may couple the switch node 120 to ground by inputting the fifth set of control signals to the first switching network 108a, and inputting the sixth set of control signals to the second switching network 108b. During the second phase, the inductor 140 is deenergized, which causes the inductor current $I_L$ to decrease (e.g., ramp down), as shown in FIG. 4. The duration of the second phase is equal to (0.5-D)T. Also, during the second phase, the power transistor current $I_F$ is approximately zero since the switch node 120 and the fly capacitors 132a and 132b are decoupled from the input 112.

Figure 5C:
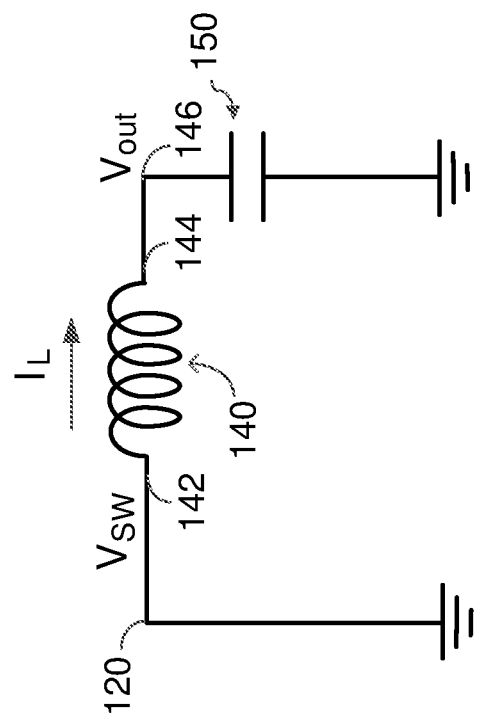
FIG. 5C shows an exemplary configuration of the buck converter during a third phase of the cycle according to certain aspects of the present disclosure.

During the third phase of the cycle, the controller 160 causes the first and second switching networks 108a and 108b to couple the second fly capacitor 132b and the first fly capacitor 132a in series between the input 112 of the buck converter 105 and ground, in which the second fly capacitor 132b is coupled between the input 112 and the switch node 120, and the first fly capacitor 132a is coupled between the switch node 120 and ground. An example of this is illustrated in FIG. 5C, which shows an equivalent circuit of the buck converter 105 during the third phase. The controller 160 may couple the second fly capacitor 132b between the input 112 and the switch node 120 by inputting the third set of control signals to the second switching network 108b, and couple the first fly capacitor 132a between the switch node 120 and ground by inputting the second set of control signals to the first switching network 108a.

During the third phase, the voltage $V_{SW}$ at the switch node 120 is approximately equal to $V_{in}/2$. This is because the voltage across each of the first and second fly capacitors 132a and 132b is approximately equal to $V_{in}/2$, and the switch node 120 is between the second fly capacitor 132b and the first fly capacitor 132a. Since the switch node voltage of $V_{in}/2$ is greater than the output voltage $V_{out}$ for the case where the duty cycle is less than 50%, the inductor 140 is energized during the third phase, which causes the inductor current $I_L$ to increase (e.g., ramp up), as shown in FIG. 4. The duration of the third phase is equal to DT. Also, during the third phase, the buck converter 106 draws current $I_F$ from the power source 170 through the power transistor 165 to charge the second fly capacitors 132b.

Figure 5D:
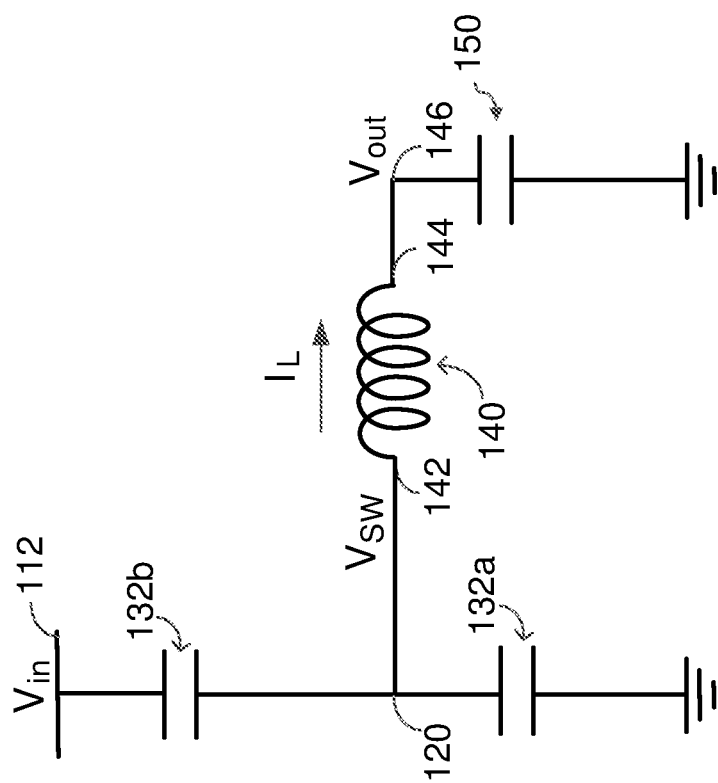
FIG. 5D shows an exemplary configuration of the buck converter during a fourth phase of the cycle according to certain aspects of the present disclosure.

During the fourth phase of the cycle, the controller 160 causes the first and second switching networks 108a and 108b to couple the switch node 120 to ground. An example of this is illustrated in FIG. 5D, which shows an equivalent circuit of the buck converter 105 during the fourth phase. During the fourth phase, the inductor 140 is deenergized, which causes the inductor current $I_L$ to decrease (e.g., ramp down), as shown in FIG. 4. The duration of the fourth phase is equal to (0.5-D)T. Also, during the fourth phase, the power transistor current $I_F$ is approximately zero since the switch node 120 and the fly capacitors 132a and 132b are decoupled from the input 112. Note that, in this example, the configuration of the buck converter 105 in the fourth phase is the same as the configuration of the buck converter 105 in the second phase.

As shown in FIG. 4, during out-of-phase operation, the buck converter 105 draws current through the power transistor 165 during both the first phase and the third phase of each cycle. Thus, the current drawn through the power transistor 165 is spread out over two phases of each cycle instead of one phase of each cycle, which reduces the ripple current of the power transistor 165. The lower ripple current reduces the power loss in the power transistor 165 thereby improving power efficiency. In addition, the lower ripple current reduces the capacitance requirement for the input capacitor 114, allowing the use of a smaller input capacitor 114.

In FIG. 2, the change in the power transistor current $I_F$ during the first phase of each cycle for in-phase operation is given by $\Delta I_1$. In FIG. 4, the change in the power transistor current $I_F$ during the first phase and the third phase of each cycle for out-of-phase operation is given by $\Delta I_2$. In these examples, $\Delta I_2$ is equal to approximately half of $\Delta I_1$, which is indicative of a lower ripple current for the power transistor 165 during out-of-phase operation compared with in-phase operation.

In certain aspects, the root-mean-square power transistor current for in-phase operation may be given by:

$$I_{F\_RMS\_In\_Ph} = I_{out}\sqrt{D}\sqrt{1 + \frac{1}{3}\left(\frac{\Delta I_1}{I_{out}}\right)^2} \qquad (1)$$

where $I_{F\_RMS\_In\_Ph}$ is the root-mean-square power transistor current for in-phase operation, $I_{out}$ is the output current of the buck converter 105, and D is the duty cycle. Note that the duty cycle is less than 50% for this case (i.e., D<0.5). The root-mean-square power transistor current for out-of-phase operation may be given by:

$$I_{F\_RMS\_Out\_of\_Ph} = 0.5 I_{out}\sqrt{2D}\sqrt{1 + \frac{1}{3}\left(\frac{\Delta I_2}{0.5 I_{out}}\right)^2} \qquad (2)$$

where $I_{F\_RMS\_Out\_of\_Ph}$ is the root-mean-square power transistor current for out-of-phase operation, $I_{out}$ is the output current of the buck converter 105, and D is the duty cycle. Note that the duty cycle is less than 50% for this case (i.e., D<0.5). Computing the ratio of $I_{F\_RMS\_Out\_of\_Ph}$ over $I_{F\_RMS\_In\_Ph}$ results in the following:

$$\frac{I_{F\_RMS\_Out\_of\_Ph}}{I_{F\_RMS\_In\_Ph}} = 0.5\sqrt{2} = 0.707. \qquad (3)$$

As shown in equation (3), the root-mean-square power transistor current for out-of-phase operation is almost 30 percent less than the root-mean-square power transistor current for in-phase operation. The lower root-mean-square power transistor current translates into a reduction in the power loss in the power transistor 165, which may be shown by the following ratio:

$$\frac{P_{Out\_of\_Ph}}{P_{In\_Ph}} = \frac{[I_{F\_RMS\_Out\_of\_Ph}]^2}{[I_{F\_RMS\_In\_Ph}]^2} = 0.5 \quad (4)$$

where $P_{out\_of\_Ph}$ is the power loss in the power transistor 165 for out-of-phase operation, and $P_{in\_Ph}$ is the power loss in the power transistor 165 for in-phase operation. As shown in equation (4), the power loss in the power transistor 165 is reduced by 50% for out-of-phase operation compared with in-phase operation for the case where D≤0.5. The reduced power loss in the power transistor 165 improves power efficiency. As discussed further below, out-of-phase operation may also be used to improve power efficiency for the case where D>0.5, although to a lesser degree compared with the case where D≤0.5.

Figure 6:
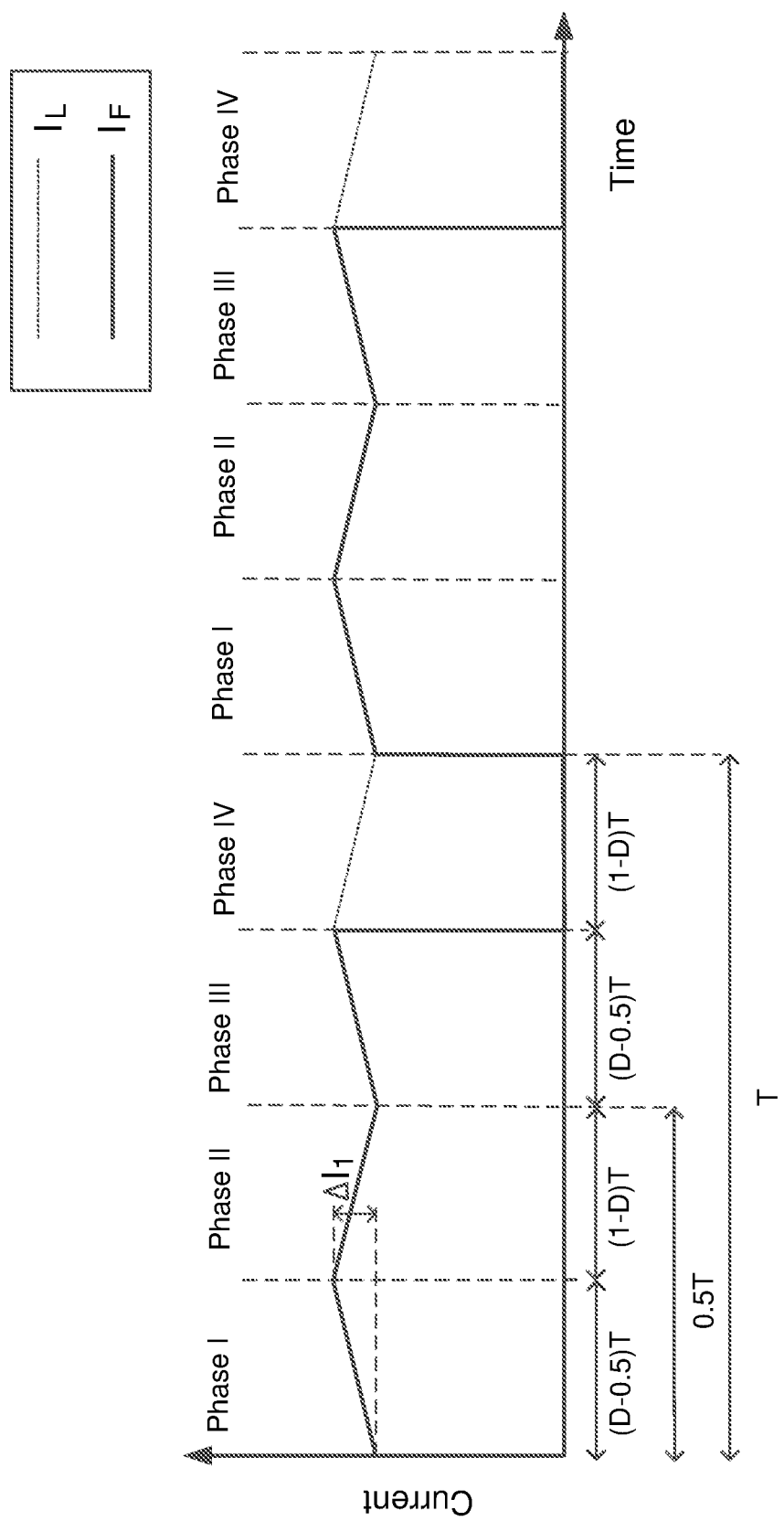
FIG. 6 shows exemplary waveforms for a buck converter for the case of in-phase operation and a duty cycle greater than 50% according to certain aspects of the present disclosure.

An example of in-phase operation of the buck converter 105 will now be discussed with reference to FIG. 6 and FIGS. 7A to 7D for the case where the duty cycle of the buck converter 105 is greater than 50% and the output voltage $V_{out}$ is between $V_{in}/2$ and $V_{in}$. FIG. 6 shows an example of the power transistor current $I_F$ and the inductor current $I_L$ over two cycles during in-phase operation. FIGS. 7A to 7D illustrate exemplary configurations of the buck converter 105 during the different phases of a cycle for in-phase operation.

In this example, the first switching network 108a may also be configured to couple the switch node 120 to the input 112 of the buck converter 105 in response to a seventh set of control values, and the second switching network 108b may also be configured to couple the switch node 120 to the input 112 of the buck converter 105 in response to a eighth set of control values.

During the first phase of a cycle, the controller 160 causes the first and second switching networks 108a and 108b to couple the switch node 120 to the input 112 of the buck converter 105. An example of this is illustrated in FIG. 7A, which shows an equivalent circuit of the buck converter 105 during the first phase. The controller 160 may couple the switch node 120 to the input 112 by inputting the seventh set of control signals to the first switching network 108a and inputting the eighth set of control signals to the second switching network 108b. During the first phase, the inductor 140 is energized, which causes the inductor current $I_L$ to increase (e.g., ramp up). The duration of the first phase is equal to (D−0.5)T where D>0.5. Also, during the first phase, the buck converter 106 draws current $I_F$ from the power source 170 through the power transistor 165 since the switch node 120 is coupled to the input 112. Note that, in FIG. 6, the inductor current $I_L$ and the transistor current $I_F$ overlap during the first phase.

During the second phase of the cycle, the controller 160 causes the first and second switching networks 108a and 108b to couple the first and second fly capacitors 132a and 132b in parallel between the input 112 of the buck converter 105 and the switch node 120. An example of this is illustrated in FIG. 7B, which shows an equivalent circuit of the buck converter 105 during the second phase. The controller 160 may couple the first fly capacitor 132a between the input 112 and the switch node 120 by inputting the first set of control signals to the first switching network 108a, and couple the second fly capacitor 132b between the input 112 and the switch node 120 by inputting the third set of control signals to the second switching network 108b.

During the second phase, the voltage $V_{SW}$ at the switch node 120 is approximately equal to $V_{in}/2$. Because the output voltage $V_{out}$ is greater than the switch node voltage of $V_{in}/2$ for the case where the duty cycle is greater than 50%, the inductor 140 is deenergized during the second phase, which causes the inductor current $I_L$ to decrease (e.g., ramp down). The duration of the second phase is equal to (1-D)T. Also, during the second phase, the buck converter 106 draws current $I_F$ from the power source 170 through the power transistor 165, as shown in FIG. 6. Note that, in FIG. 6, the inductor current $I_L$ and the transistor current $I_F$ overlap during the second phase.

During the third phase of the cycle, the controller 160 causes the first and second switching networks 108a and 108b to couple the switch node 120 to the input 112 of the buck converter 105. An example of this is illustrated in FIG. 7C, which shows an equivalent circuit of the buck converter 105 during the third phase. During the third phase, the inductor 140 is energized, which causes the inductor current $I_L$ to increase (e.g., ramp up). The duration of the third phase is equal to (D−0.5)T where D>0.5. Also, during the third phase, the buck converter 106 draws current $I_F$ from the power source 170 through the power transistor 165 since the switch node 120 is coupled to the input 112. Note that, in FIG. 6, the inductor current $I_L$ and the transistor current $I_F$ overlap during the third phase. In this example, the configuration of the buck converter 105 is the same in the first phase and the third phase.

During the fourth phase of the cycle, the controller 160 causes the first and second switching networks 108a and 108b to couple the first and second fly capacitors 132a and 132b in parallel between the switch node 120 and ground. An example of this is illustrated in FIG. 7D, which shows an equivalent circuit of the buck converter 105 during the fourth phase. The controller 160 may couple the first fly capacitor 132a between the switch node 120 and ground by inputting the second set of control signals to the first switching network 108a, and couple the second fly capacitor 132b between the switch node 120 and ground by inputting the fourth set of control signals to the second switching network 108b.

During the fourth phase, the voltage $V_{SW}$ at the switch node 120 is approximately equal to $V_{in}/2$. Because the output voltage $V_{out}$ is greater than the switch node voltage of $V_{in}/2$ for the case where the duty cycle is greater than 50%, the inductor 140 is deenergized during the fourth phase, which causes the inductor current $I_L$ to decrease (e.g., ramp down). The duration of the fourth phase is equal to (1-D)T. Also, during the fourth phase, the power transistor current $I_F$ is approximately zero since the switch node 120 and the fly capacitors 132a and 132b are decoupled from the input 112.

As shown in FIG. 6, during in-phase operation, the buck converter 105 draws current through the power transistor 165 during the first, second and third phases of each cycle for the case where the duty cycle is greater than 50%.

Figure 8:
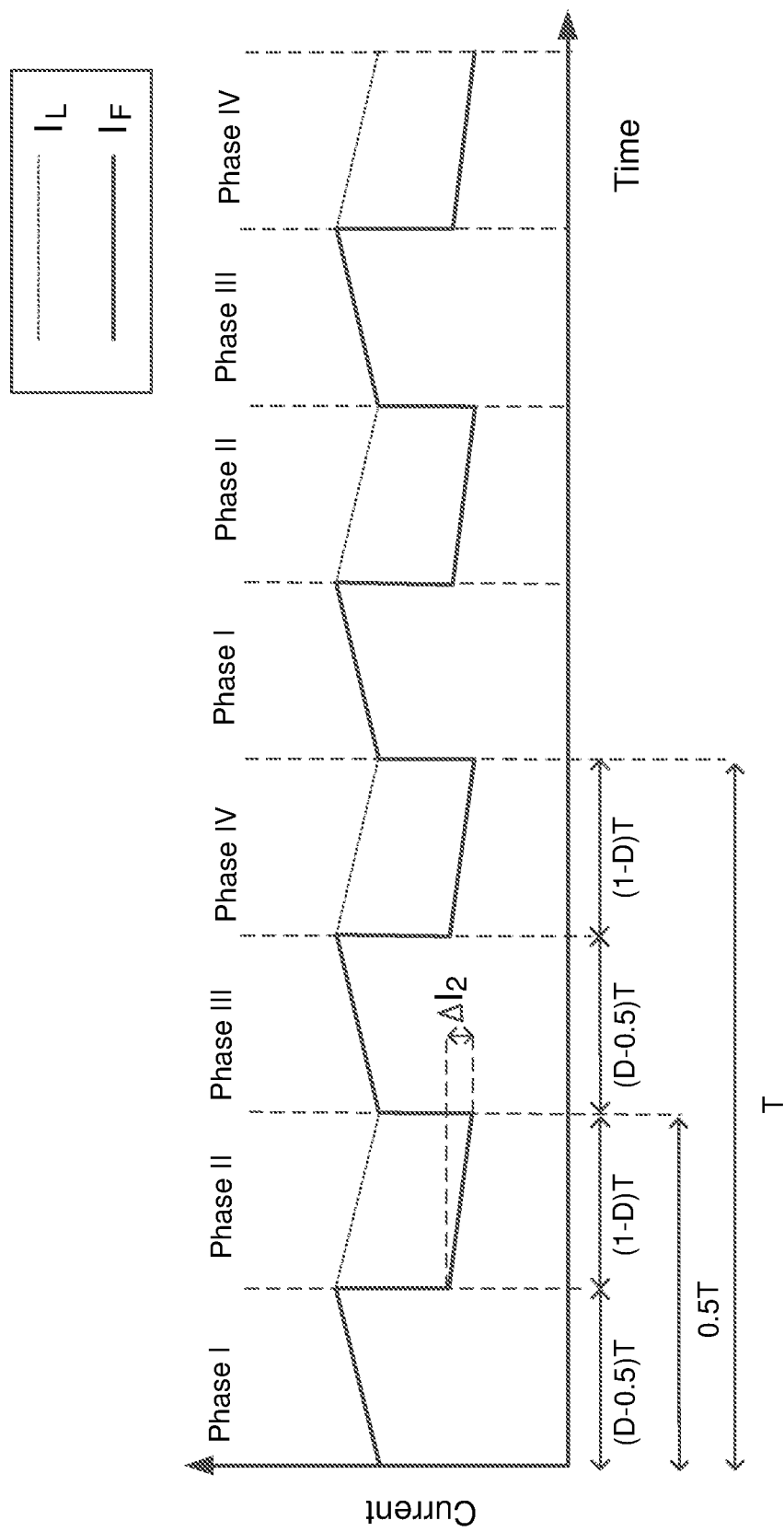
FIG. 8 shows exemplary waveforms for a buck converter for the case of out-of-phase operation and a duty cycle greater than 50% according to certain aspects of the present disclosure.

An example of out-of-phase operation of the buck converter 105 will now be discussed with reference to FIG. 8 and FIGS. 9A to 9D for the case where the duty cycle of the buck converter 105 is greater than 50% and the output voltage $V_{out}$ is between $V_{in}/2$ and $V_{in}$. FIG. 8 shows an example of the power transistor current $I_F$ and the inductor current $I_L$ over two cycles during out-of-phase operation.

FIGS. 9A to 9D illustrate exemplary configurations of the buck converter 105 during the different phases of a cycle for out-of-phase operation.

Figures 9A, 9B:
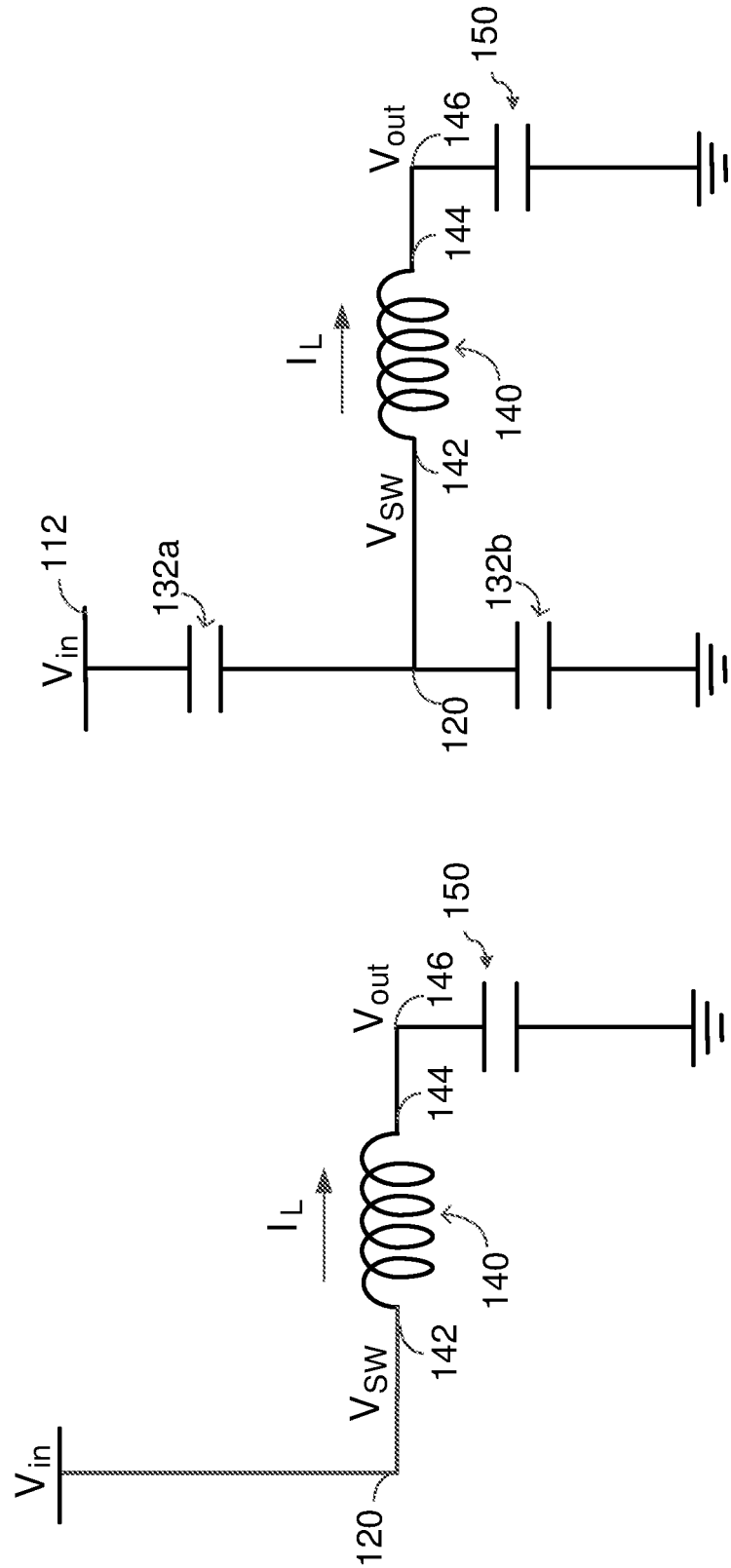
FIG. 9A shows an exemplary configuration of a buck converter during a first phase of a cycle for the case of out-of-phase operation and a duty cycle greater than 50% according to certain aspects of the present disclosure.
FIG. 9B shows an exemplary configuration of the buck converter during a second phase of the cycle according to certain aspects of the present disclosure.

During the first phase of a cycle, the controller 160 causes the first and second switching networks 108a and 108b to couple the switch node 120 to the input 112 of the buck converter 105. An example of this is illustrated in FIG. 9A, which shows an equivalent circuit of the buck converter 105 during the first phase. The controller 160 may couple the switch node 120 to the input 112 by inputting the seventh set of control signals to the first switching network 108a, and inputting the eighth set of control values to the second switching network 108b. During the first phase, the inductor 140 is energized, which causes the inductor current $I_L$ to increase (e.g., ramp up). The duration of the first phase is equal to (D−0.5)T where D>0.5. Also, during the first phase, the buck converter 106 draws current $I_F$ from the power source 170 through the power transistor 165 since the switch node 120 is coupled to the input 112. Note that, in FIG. 8, the inductor current $I_L$ and the transistor current $I_F$ overlap during the first phase.

During the second phase of the cycle, the controller 160 causes the first and second switching networks 108a and 108b to couple the first fly capacitor 132a and the second fly capacitor 132b in series between the input 112 of the buck converter 105 and ground, in which the first fly capacitor 132a is coupled between the input 112 and the switch node 120, and the second fly capacitor 132b is coupled between the switch node 120 and ground. An example of this is illustrated in FIG. 9B, which shows an equivalent circuit of the buck converter 105 during the second phase. The controller 160 may couple the first fly capacitor 132a between the input 112 and the switch node 120 by inputting the first set of control signals to the first switching network 108a, and couple the second fly capacitor 132b between the switch node 120 and ground by inputting the fourth set of control signals to the second switching network 108b.

During the second phase, the voltage $V_{SW}$ at the switch node 120 is approximately equal to $V_{in}/2$. Since the output voltage $V_{out}$ is greater than the switch node voltage of $V_{in}/2$ for the case where the duty cycle is greater than 50%, the inductor 140 is deenergized during the second phase, which causes the inductor current $I_L$ to decrease (e.g., ramp down), as shown in FIG. 8. The duration of the second phase is (1−D)T. Also, during the second phase, the buck converter 106 draws current $I_F$ from the power source 170 through the power transistor 165 to charge the first fly capacitor 132a.

During the third phase of the cycle, the controller 160 causes the first and second switching networks 108a and 108b to couple the switch node 120 to the input 112 of the buck converter 105. An example of this is illustrated in FIG. 9C, which shows an equivalent circuit of the buck converter 105 during the third phase. During the third phase, the inductor 140 is energized, which causes the inductor current $I_L$ to increase (e.g., ramp up). The duration of the third phase is equal to (D−0.5)T where D>0.5. Also, during the third phase, the buck converter 106 draws current $I_F$ from the power source 170 through the power transistor 165 since the switch node 120 is coupled to the input 112. Note that, in FIG. 8, the inductor current $I_L$ and the transistor current $I_F$ overlap during the third phase. In this example, the configuration of the buck converter 105 is the same in the first phase and the third phase.

During the fourth phase of the cycle, the controller 160 causes the first and second switching networks 108a and 108b to couple the second fly capacitor 132b and the first fly capacitor 132a in series between the input 112 of the buck converter 105 and ground, in which the second fly capacitor 132b is coupled between the input 112 and the switch node 120, and the first fly capacitor 132a is coupled between the switch node 120 and ground. An example of this is illustrated in FIG. 9D, which shows an equivalent circuit of the buck converter 105 during the fourth phase. The controller 160 may couple the second fly capacitor 132b between the input 112 and the switch node 120 by inputting the third set of control signals to the second switching network 108b. The controller 160 may couple the first fly capacitor 132a between the switch node 120 and ground by inputting the second set of control values to the first switching network 108a.

During the fourth phase, the voltage $V_{SW}$ at the switch node 120 is approximately equal to $V_{in}/2$. Since the output voltage $V_{out}$ is greater than the switch node voltage of $V_{in}/2$ for the case where the duty cycle is greater than 50%, the inductor 140 is deenergized during the fourth phase, which causes the inductor current $I_L$ to decrease (e.g., ramp down), as shown in FIG. 8. The duration of the fourth phase is (1−D)T. Also, during the second phase, the buck converter 106 draws current $I_F$ from the power source 170 through the power transistor 165 to charge the second fly capacitor 132b.

As shown in FIG. 8, during out-of-phase operation, the buck converter 105 draws current through the power transistor 165 during the first, second, third and fourth phases of each cycle for the case where the duty cycle is greater than 50%. A comparison of FIG. 8 with FIG. 6 shows that the current $I_F$ drawn through the power transistor 165 during the second phase of each cycle for in-phase operation is spread over the second and fourth phases of each cycle for out-of-phase operation. As a result, the ripple current of the power transistor 165 is reduced for out-of-phase operation compared with in-phase operation, resulting in lower power loss in the power transistor 165 and higher power efficiency. As the duty cycle is increased above 50%, the duration of the second and fourth phases of each cycle decreases, which reduces the improvement in power efficiency provided by out-of-phase operation compared with in-phase operation. This case be seen from the following ratio:

$$\frac{P_{Out\_of\_Ph}}{P_{In\_Ph}} = \frac{[I_{F\_RMS\_Out\_of\_Ph}]^2}{[I_{F\_RMS\_In\_Ph}]^2} = \frac{1.5D - 0.5}{D} \quad (5)$$

where equation (5) applies to the case where the duty cycle is greater than 50%. As shown in equation (5), the power loss for out-of-phase operation is about half that for in-phase operation when the duty cycle is approximately 50%. As the duty cycle is increased above 50%, the power loss for out-of-phase operation approaches the power loss for in-phase operation (i.e., the ratio in equation (5) approaches one as D is increased). For the case where the duty cycle is equal to or less than 50%, the power loss for out-of-phase operation is about half that for in-phase operation, as shown in equation (4).

Figure 10A:
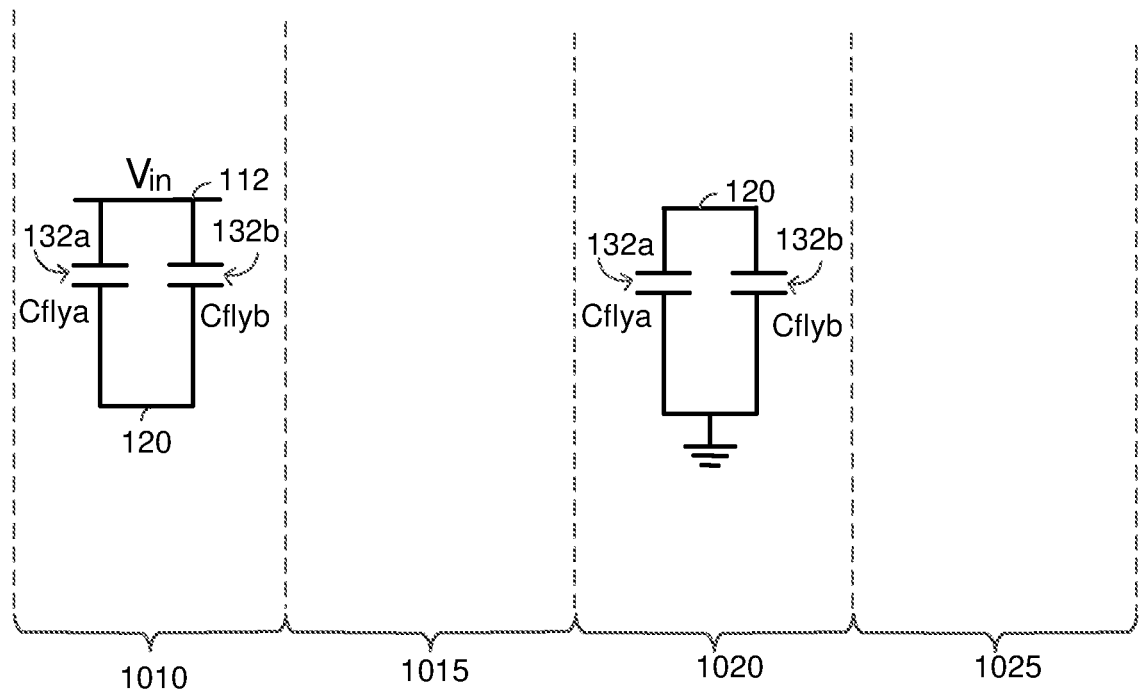
FIG. 10A shows exemplary configurations for first and second fly capacitors during different phases of a cycle for the case of in-phase operation and a duty cycle of less than 50% according to certain aspects of the present disclosure.

FIG. 10A shows exemplary configurations of the first and second fly capacitors 132a and 132b during different portions (e.g., phases) of a cycle according to certain aspects for the case of in-phase operation and a duty cycle of less than 50%. Note that the inductor 140 is not shown in FIG. 10A for ease of illustration. During a first portion 1010 (e.g., the first phase) of the cycle, the controller 160 causes the switching networks 108a and 108b to couple the first and second fly capacitors 132a and 132b in parallel between the input 112 and the switch node 120 (e.g., by inputting the first set of control values to the first switching network 108a and inputting the third set of control values to the second switching network 108b). An example of this configuration is illustrated in FIG. 3A discussed above. During a second portion 1020 (e.g., the third phase) of the cycle, the controller 160 causes the switching networks 108a and 108b to couple the first and second fly capacitors 132a and 132b in parallel between the switch node 120 and ground (e.g., by inputting the second set of control values to the first switching network 108a and inputting the fourth set of control values to the second switching network 108b). An example of this configuration is illustrated in FIG. 3C discussed above. The inductor 140 is energized during the first and second portions 1010 and 1020 (e.g., the first and third phases) of the cycle.

During a third portion 1015 (e.g., the second phase) of the cycle between the first portion 1010 and the second portion 1020 of the cycle, the switch node 120 is coupled to ground, an example of which is shown in FIG. 3B discussed above. Since the switch node 120 is coupled to ground during the third portion 1015, a configuration for the fly capacitors 132a and 132b is not shown for the third portion 1015. The switch node 120 may also be coupled to ground during a fourth portion 1025 (e.g., the fourth phase) of the cycle, an example of which is shown in FIG. 3D discussed above. As discussed above, the controller 160 may couple the switch node 120 to ground by inputting the fifth set of control values to the first switching network 108a and inputting the sixth set of control values to the second switching network 108b.

It is to be appreciated that the present disclosure is not limited to the exemplary order of the first portion 1010 and the second portion 1020 of the cycle shown in FIG. 10A. For example, the order of the first portion 1010 and the second portion 1020 may be swapped in which the second portion 1020 precedes the first portion 1010 in the cycle. In this regard, it is to be appreciated that designations such as "first," "second," and so forth for different portions of a cycle are used to distinguish between the different portions of the cycle and are not intended to limit the portions so designated to a particular order in the cycle.

Figure 10B:
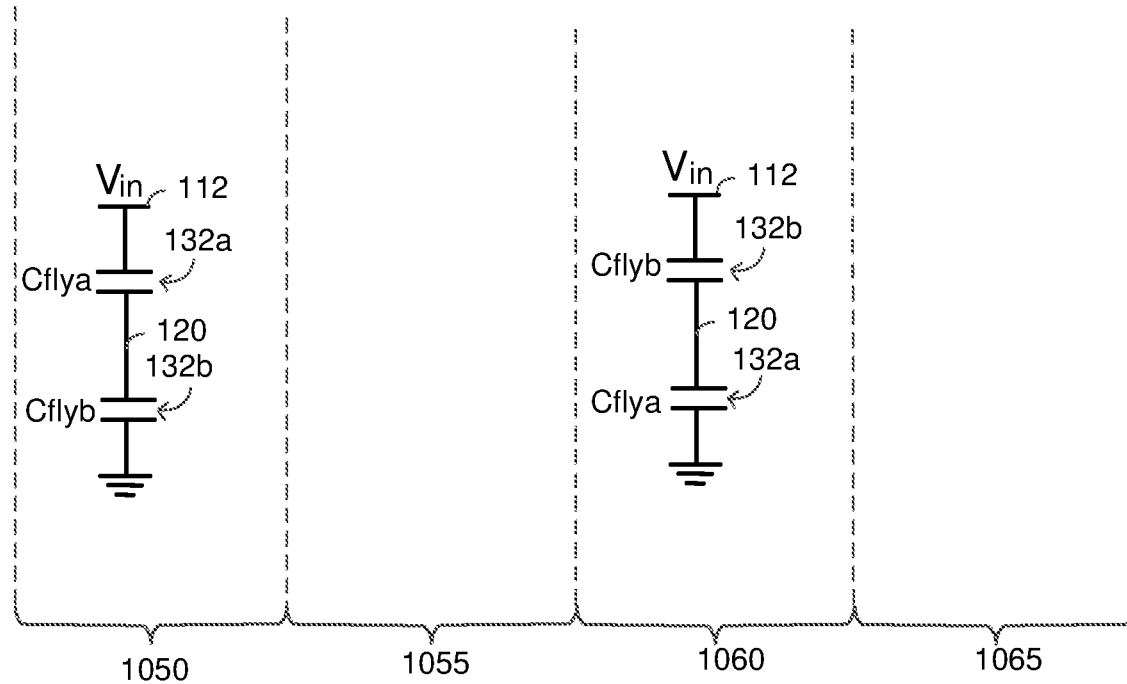
FIG. 10B shows exemplary configurations for first and second fly capacitors during different phases of a cycle for the case of out-of-phase operation and a duty cycle of less than 50% according to certain aspects of the present disclosure.

FIG. 10B shows exemplary configurations of the first and second fly capacitors 132a and 132b during different portions (e.g., phases) of a cycle according to certain aspects for the case of out-of-phase operation and a duty cycle of less than 50%. During a first portion 1050 (e.g., the first phase) of the cycle, the controller 160 causes the switching networks 108a and 108b to couple the first fly capacitor 132a and the second fly capacitor 132b in series between the input 112 and ground, in which the first fly capacitor 132a is between the input 112 and the switch node 120, and the second fly capacitor 132b is between the switch node 120 and ground (e.g., by inputting the first set of control values to the first switching network 108a and inputting the fourth set of control values to the second switching network 108b). An example of this configuration is illustrated in FIG. 5A discussed above. During a second portion 1060 (e.g., the third phase) of the cycle, the controller 160 causes the switching networks 108a and 108b to couple the second fly capacitor 132b and the first fly capacitor 132a in series between the input 112 and ground, in which the second fly capacitor 132b is between the input 112 and the switch node 120, and the first fly capacitor 132a is between the switch node 120 and ground (e.g., by inputting the second set of control values to the first switching network 108a and inputting the third set of control values to the second switching network 108b). An example of this configuration is illustrated in FIG. 5C discussed above. The inductor 140 is energized during the first and second portions 1050 and 1060 (e.g., the first and third phases) of the cycle.

During a third portion 1055 (e.g., the second phase) of the cycle between the first portion 1050 and the second portion 1060 of the cycle, the switch node 120 is coupled to ground, an example of which is shown in FIG. 5B discussed above. Since the switch node 120 is coupled to ground during the third portion 1055, a configuration for the fly capacitors 132a and 132b is not shown for the third portion 1055. The switch node 120 may also be coupled to ground during a fourth portion 1065 (e.g., the fourth phase) of the cycle, an example of which is shown in FIG. 5D discussed above. As discussed above, the controller 160 may couple the switch node 120 to ground by inputting the fifth set of control values to the first switching network 108a and inputting the sixth set of control values to the second switching network 108b.

It is to be appreciated that the present disclosure is not limited to the exemplary order of the first portion 1050 and the second portion 1060 of the cycle shown in FIG. 10B. For example, the order of the first portion 1050 and the second portion 1060 may be swapped in which the second portion 1060 precedes the first portion 1050 in the cycle. In this regard, it is to be appreciated that designations such as "first," "second," and so forth for different portions of a cycle are used to distinguish between the different portions of the cycle and are not intended to limit the portions so designated to a particular order in the cycle.

Figure 11A:
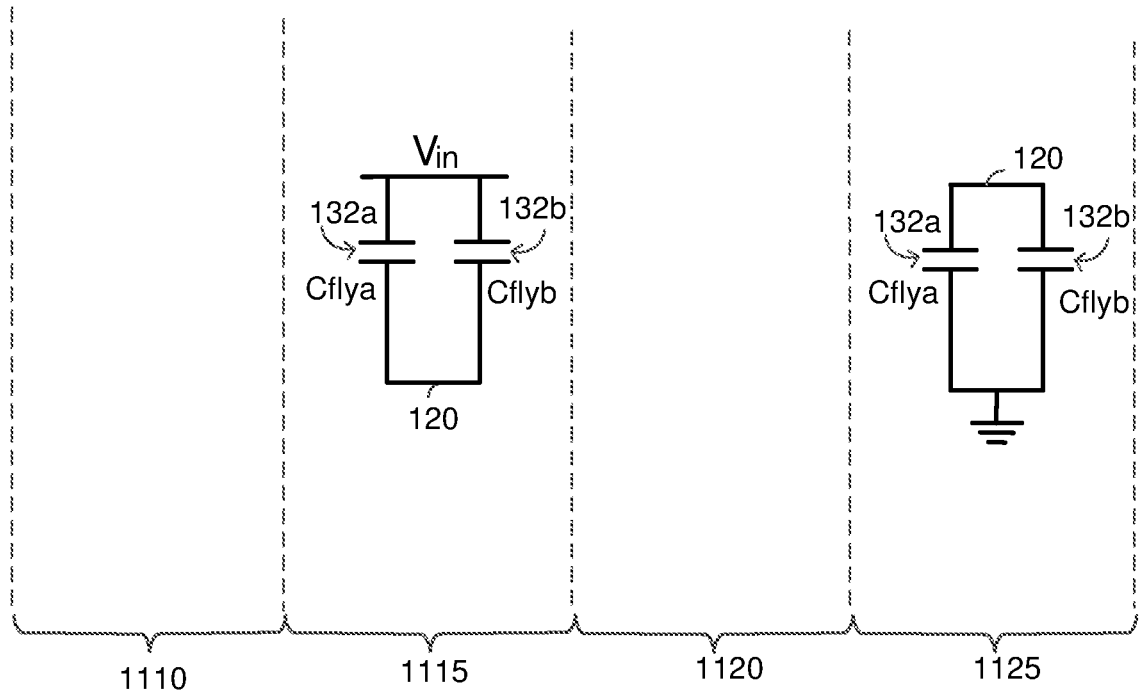
FIG. 11A shows exemplary configurations for first and second fly capacitors during different phases of a cycle for the case of in-phase operation and a duty cycle greater than 50% according to certain aspects of the present disclosure.

FIG. 11A shows exemplary configurations of the first and second fly capacitors 132a and 132b during different portions (e.g., phases) of a cycle according to certain aspects for the case of in-phase operation and a duty cycle greater than 50%. Note that the inductor 140 is not shown in FIG. 11A for ease of illustration. During a first portion 1115 (e.g., the second phase) of the cycle, the controller 160 causes the switching networks 108a and 108b to couple the first and second fly capacitors 132a and 132b in parallel between the input 112 and the switch node 120 (e.g., by inputting the first set of control values to the first switching network 108a and inputting the third set of control values to the second switching network 108b). An example of this configuration is illustrated in FIG. 7B discussed above. During a second portion 1125 (e.g., the fourth phase) of the cycle, the controller 160 causes the switching networks 108a and 108b to couple the first and second fly capacitors 132a and 132b in parallel between the switch node 120 and ground (e.g., by inputting the second set of control values to the first switching network 108a and inputting the fourth set of control values to the second switching network 108b). An example of this configuration is illustrated in FIG. 7D discussed above. The inductor 140 is deenergized during the first and second portions 1115 and 1125 (e.g., the second and fourth phases) of the cycle.

During a third portion 1120 (e.g., the third phase) of the cycle between the first portion 1115 and the second portion 1125 of the cycle, the switch node 120 is coupled to the input 112 of the buck converter 105, as example of which is shown in FIG. 7C discussed above. Since the switch node 120 is coupled to the input 112 during the third portion 1120, a configuration for the fly capacitors 132a and 132b is not shown for the third portion 1120. The switch node 120 may also be coupled to the input 112 during a fourth portion 1110 (e.g., the first phase) of the cycle, an example of which is shown in FIG. 7A discussed above. As discussed above, the controller 160 may couple the switch node 120 to the input 112 by inputting the seventh set of control values to the first switching network 108a and inputting the eighth set of control values to the second switching network 108b.

It is to be appreciated that the present disclosure is not limited to the exemplary order of the first portion 1115 and the second portion 1125 of the cycle shown in FIG. 11A. For example, the order of the first portion 1115 and the second portion 1125 may be swapped in which the second portion 1125 precedes the first portion 1115. As discussed above, designations such as "first," "second," and so forth for different portions of a cycle are used to distinguish between the different portions of the cycle and are not intended to limit the portions so designated to a particular order in the cycle.

Figure 11B:
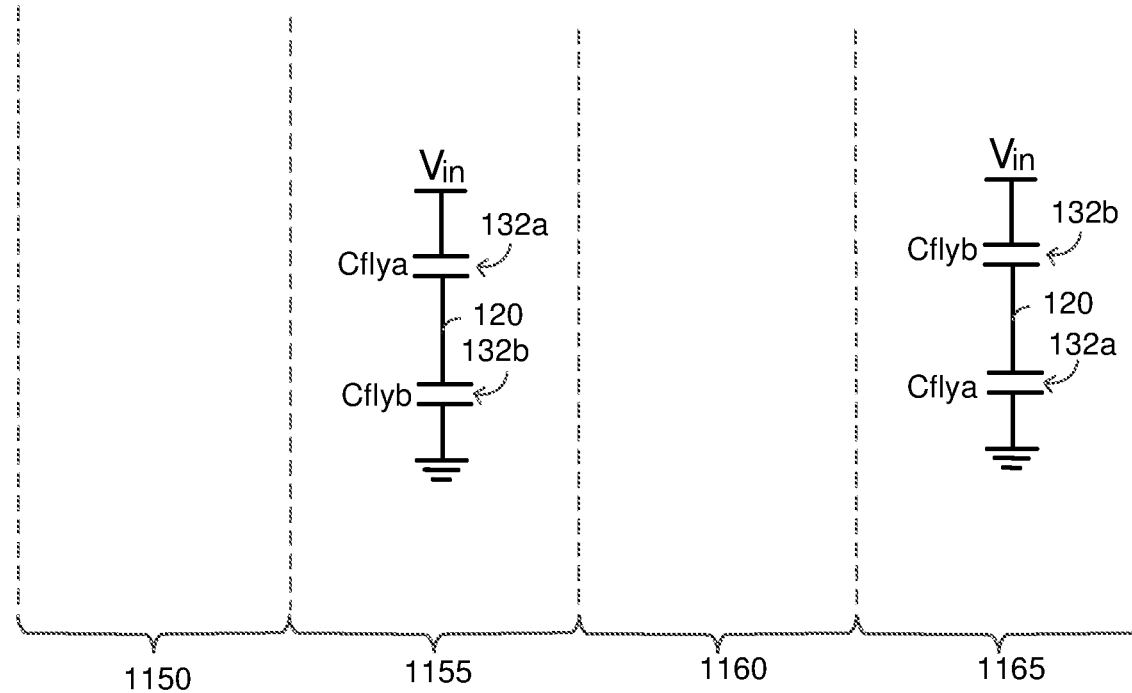
FIG. 11B shows exemplary configurations for first and second fly capacitors during different phases of a cycle for the case of out-of-phase operation and a duty cycle greater than 50% according to certain aspects of the present disclosure.

FIG. 11B shows exemplary configurations of the first and second fly capacitors 132a and 132b during different portions (e.g., phases) of a cycle according to certain aspects for the case of out-of-phase operation and a duty cycle greater than 50%. During a first portion 1155 (e.g., the second phase) of the cycle, the controller 160 causes the switching networks 108a and 108b to couple the first fly capacitor 132a and the second fly capacitor 132b in series between the input 112 and ground, in which the first fly capacitor 132a is between the input 112 and the switch node 120, and the second fly capacitor 132b is between the switch node 120 and ground (e.g., by inputting the first set of control values to the first switching network 108a and inputting the fourth set of control values to the second switching network 108b). An example of this configuration is illustrated in FIG. 9B discussed above. During a second portion 1165 (e.g., the fourth phase) of the cycle, the controller 160 causes the switching networks 108a and 108b to couple the second fly capacitor 132b and the first fly capacitor 132a in series between the input 112 and ground, in which the second fly capacitor 132b is between the input 112 and the switch node 120, and the first fly capacitor 132a is between the switch node 120 and ground (e.g., by inputting the second set of control values to the first switching network 108a and inputting the third set of control values to the second switching network 108b). An example of this configuration is illustrated in FIG. 9D discussed above. The inductor 140 is deenergized during the first and second portions 1155 and 1165 (e.g., the second and fourth phases) of the cycle.

During a third portion 1160 (e.g., the third phase) of the cycle between the first portion 1155 and the second portion 1165 of the cycle, the switch node 120 is coupled to the input 112 of the buck converter 105, and example of which is shown in FIG. 9C. Since the switch node 120 is coupled to the input 112, a configuration for the fly capacitors 132a and 132b is not shown for the third portion 1160. The switch node 120 may also be coupled to the input 112 during a fourth portion 1150 (e.g., the first phase) of the cycle, and example of which is shown in FIG. 9A discussed above. As discussed above, the controller 160 may couple the switch node 120 to the input 112 by inputting the seventh set of control values to the first switching network 108a and inputting the eighth set of control values to the second switching network 108b.

It is to be appreciated that the present disclosure is not limited to the exemplary order of the first portion 1155 and the second portion 1165 of the cycle shown in FIG. 11B. For example, the order of the first portion 1155 and the second portion 1165 may be swapped in which the second portion 1165 precedes the first portion 1155 in the cycle. In this regard, it is to be appreciated that designations such as "first," "second," and so forth for different portions of a cycle are used to distinguish between the different portions of the cycle and are not intended to limit the portions so designated to a particular order in the cycle.

It may be desirable to balance the voltages of the first and second fly capacitors 132a and 132b at approximately half the input voltage $V_{in}/2$ for efficient operation of the buck converter 105. In one approach, the voltages of the first and second fly capacitors 132a and 132b are balanced using an additional balancing circuit (not shown), which may include additional transistors and a balancing capacitor. The balancing circuit may take up a relatively large area on a chip and cause additional power loss.

To address this, the controller 160 may operate the buck converter 105 in a mix mode in which the controller 160 switches the buck converter 105 between in-phase operation and out-of-phase operation. By switching the buck converter 105 between in-phase operation and out-of-phase operation, the controller 160 is able to balance the voltages of the first and second fly capacitors 132a and 132b at approximately $V_{in}/2$ without the need for the additional balancing circuit discussed above. This is because the fly capacitors 132a and 132b are coupled in series during out-of-phase operation and coupled in parallel during in-phase operation. When the fly capacitors 132a and 132b are coupled in series between $V_{in}$ and ground during out-of-phase operation, the combined voltage of the fly capacitors 132a and 132b is approximately equal to $V_{in}$. When the fly capacitors 132a and 132b are coupled in parallel during in-phase operation, the voltages of the fly capacitors 132a and 132b are balanced at approximately half the combined voltage (i.e., $V_{in}/2$) assuming the capacitances of the fly capacitors 132a and 132b are approximately the same.

Figure 12:
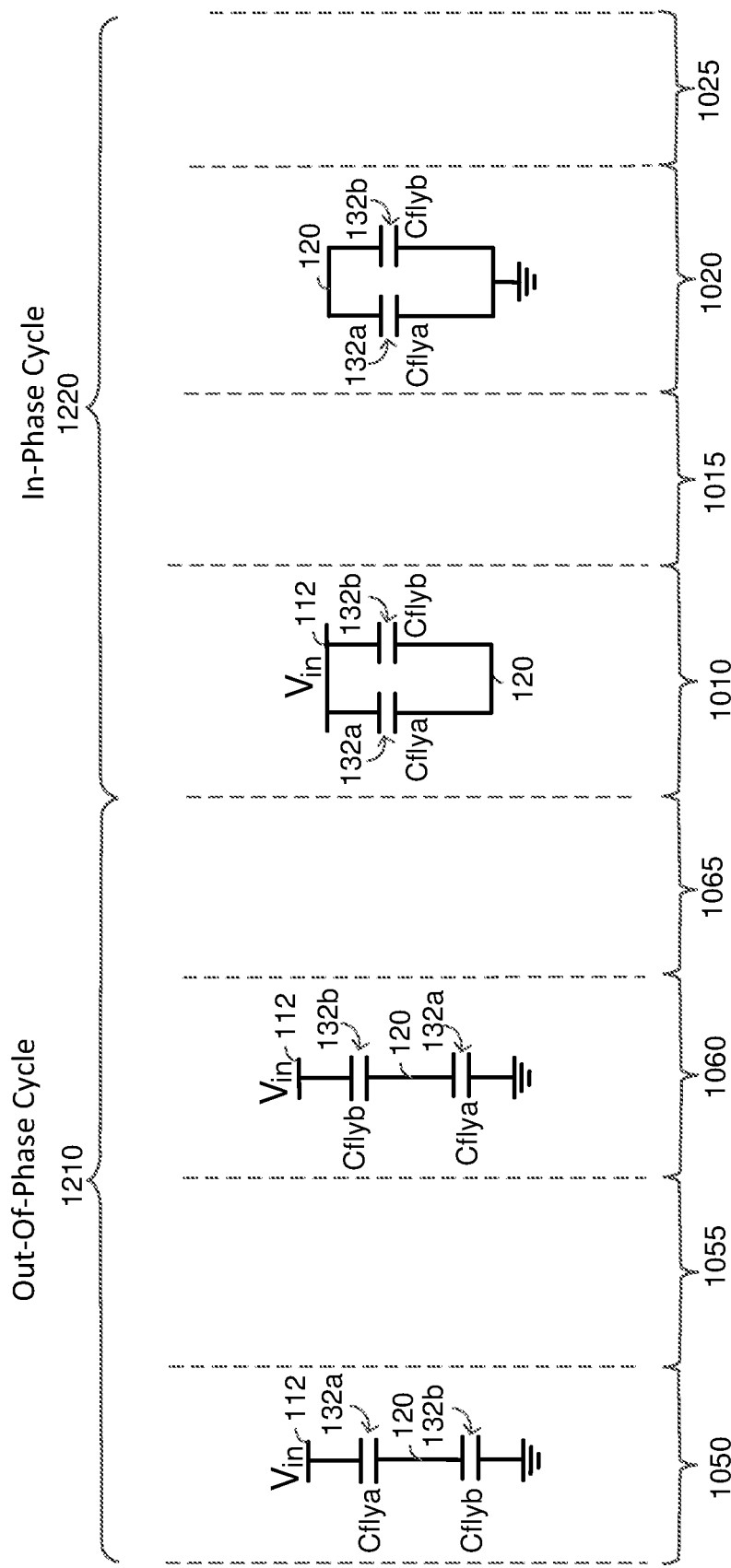
FIG. 12 illustrates an example of mix mode operation of a buck converter according to certain aspects of the present disclosure.

FIG. 12 illustrates an example of mix mode operation of the buck converter 105 according to certain aspects for the case where the duty cycle is less than 50%. In a first cycle 1210 of the buck converter 105, the controller 160 operates the buck converter 105 out-of-phase. In this regard, the first cycle 1210 may be referred to as an out-of-phase cycle. As shown in FIG. 12, the fly capacitors 132a and 132b are coupled in series during the first cycle 1210. The description of the out-of-phase cycle given above with reference to FIG. 10B applies to the first cycle 1210.

In a second cycle 1220 of the buck converter 105, the controller 160 operates the buck converter 105 in-phase. In this regard, the second cycle 1220 may be referred to as an in-phase cycle. As shown in FIG. 12, the fly capacitors 132a and 132b are coupled in parallel during the second cycle 1220. The description of the in-phase cycle given above with reference to FIG. 10A applies to the second cycle 1220. In certain aspects, the second cycle 1220 may immediately follow the first cycle 1210 (as shown in the example in FIG. 12).

Figure 13:
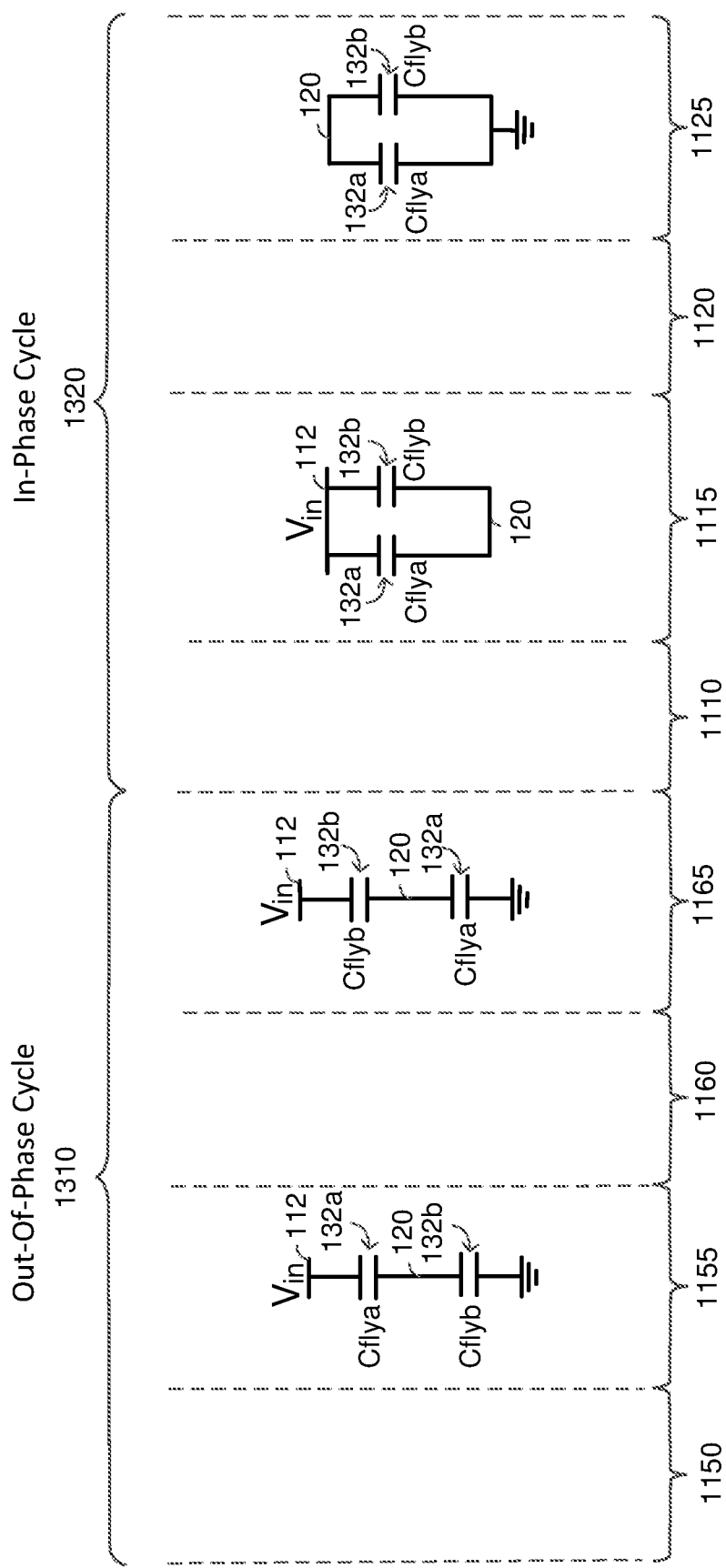
FIG. 13 illustrates another example of mix mode operation of a buck converter according to certain aspects of the present disclosure.

FIG. 13 illustrates an example of mix mode operation of the buck converter 105 according to certain aspects for the case where the duty cycle is greater than 50%. In a first cycle 1310 of the buck converter 105, the controller 160 operates the buck converter 105 out-of-phase. In this regard, the first cycle 1310 may be referred to as an out-of-phase cycle. As shown in FIG. 13, the fly capacitors 132a and 132b are coupled in series during the first cycle 1310. The description of the out-of-phase cycle given above with reference to FIG. 11B applies to the first cycle 1310.

In a second cycle 1320 of the buck converter 105, the controller 160 operates the buck converter 105 in-phase. In this regard, the second cycle 1320 may be referred to as an in-phase cycle. As shown in FIG. 13, the fly capacitors 132a and 132b are coupled in parallel during the second cycle 1320. The description of the in-phase cycle given above with reference to FIG. 11A applies to the second cycle 1320. In certain aspects, the second cycle 1320 may immediately follow the first cycle 1310 (as shown in the example in FIG. 13).

In the examples shown in FIGS. 12 and 13, the controller 160 may switch the buck converter 105 between in-phase cycles and out-of-phase cycles in mix mode operation. In one example, odd cycles of the buck converter 105 may be out-of-phase cycles and even cycles of the buck converter 105 may be in-phase cycles, or vice versa. In this example, the out-of-phase cycles reduce the root-mean-square current from the power transistor 165 (i.e., the input current) for improved power efficiency and the in-phase cycles provide voltage balancing of the fly capacitors 132a and 132b.

In certain aspects, the controller 160 may operate the buck converter 105 more frequently out-of-phase than in-phase to provide a larger reduction in the root-mean-square of the input current for higher power efficiency. In this regard, the controller 160 may operate the buck converter 105 in-phase in one cycle out of every N cycles, and operate the buck converter 105 out-of-phase in N−1 cycles out of every N cycles, where N is an integer greater than two (e.g., three, four, five, six, seven, eight, etc.). In other words, one cycle out of every N cycles is an in-phase cycle, and N−1 cycles out of every N cycles are out-of-phase cycles, in which the N cycles may be consecutive cycles of the buck converter 105. For instance, for the example in which N is equal to four, one out of every four cycles of the buck converter 105 is an in-phase cycle while three out of every four cycles of the buck converter 105 are out-of-phase cycles. In these aspects, each in-phase cycle may correspond to the exemplary in-phase cycle shown in FIG. 10A for a duty cycle of less than 50% or the exemplary in-phase cycle shown in FIG. 11A for a duty cycle greater than 50%. Each out-of-phase cycle may correspond to the exemplary out-of-phase cycle shown in FIG. 10B for a duty cycle of less than 50% or the exemplary out-of-phase cycle shown in FIG. 11B for a duty cycle greater than 50%.

Figure 14A:
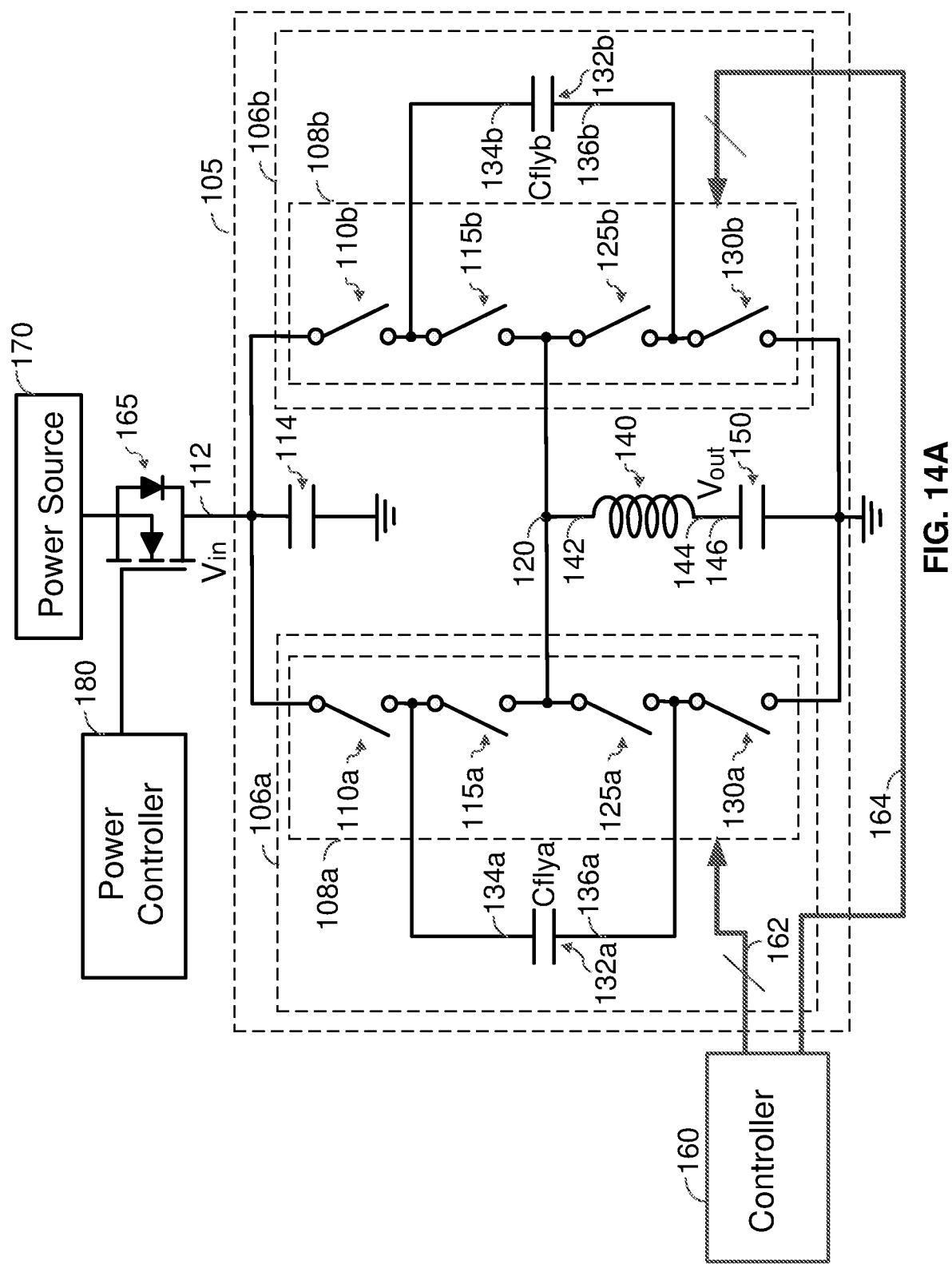
FIG. 14A shows an example of a buck converter including switches according to certain aspects of the present disclosure.

FIG. 14A shows an exemplary implementation of the first switching network 108a and the second switching network 108b. In this example, the first switching network 108a includes a first switch 110a and a second switch 115a coupled in series between the input 112 of the buck converter 105 and a switch node 120. The first switching network 108a also includes a third switch 125a and a fourth switch 130a coupled in series between the switch node 120 and ground. A first terminal 134a of the first fly capacitor 132a is coupled between the first switch 110a and the second switch 115a, and a second terminal 136a of the first fly capacitor 132a is coupled between the third switch 125a and the fourth switch 130a.

In this example, each set of control values input to the first switching network 108a via the control path 162 may control a respective one of the switches 110a, 115a, 125a and 130a in the first switching network 108a. The control path 162 may include multiple control lines in which each of the control lines carries one of the control values in a set of control values to control a respective one of the switches 110a, 115a, 125a and 130a. For ease of illustration, the individual control lines of the control path 162 are not shown in FIG. 14A. In this example, in response to the first set of control values, the first switch 110a and the third switch 125a close and the second switch 115a and the fourth switch 130a open. In response to the second set of control values, the second switch 115a and the fourth switch 130a close and the first switch 110a and the third switch 125a open. In response to the fifth set of control values, the first switch 110a and the second switch 115a open, and the third switch 125a and the fourth switch 130a close. In response to the seventh set of control values by the first switch 110a and the second switch 115a close, and the third switch 125a and the fourth switch 130a open.

In this example, the second switching network 108b includes a fifth switch 110b and a sixth switch 115b coupled in series between the input 112 of the buck converter 105 and the switch node 120. The second switching network 108b also includes a seventh switch 125b and an eighth switch 130b coupled in series between the switch node 120 and ground. A first terminal 134b of the second fly capacitor 132b is coupled between the fifth switch 110b and the sixth switch 115b, and a second terminal 136b of the second fly capacitor 132b is coupled between the seventh switch 125b and the eighth switch 130b.

In this example, each set of control values input to the second switching network 108b via the control path 164 may control a respective one of the switches 110b, 115b, 125b and 130b in the second switching network 108b. The control path 164 may include multiple control lines in which each of the control lines carries one of the control values in a set of control values to control a respective one of the switches 110b, 115b, 125b and 130b. For ease of illustration, the individual control lines of the control path 164 are not shown in FIG. 14A. In response to the third set of control values, the fifth switch 110b and the seventh switch 125b close and the sixth switch 115b and the eighth switch 130b open. In response to the fourth set of control values, the sixth switch 115b and the eighth switch 130b close and the fifth switch 110b and the seventh switch 125b open. In response to the sixth set of control values, the fifth switch 110b and the sixth switch 115b open, and the seventh switch 125b and the eighth switch 130b close. In response to the eighth set of control values the fifth switch 110b and the sixth switch 115b close, and the seventh switch 125b and the eighth switch 130b open.

It is to be appreciated that the first and second switching networks 108a and 108b are not limited to the exemplary implementation shown in FIG. 14A, and that the first and second switching networks 108a and 108b may be implemented using other arrangements of switches. In certain aspects, each of the switches 110a, 115a, 125a, 130a, 110b, 115b, 125b and 130b is implemented with a respective transistor (e.g., a respective NFET). In these aspects, the controller 160 closes a switch by turning on the respective transistor and opens a switch by turning off the respective transistor.

Figure 14B:
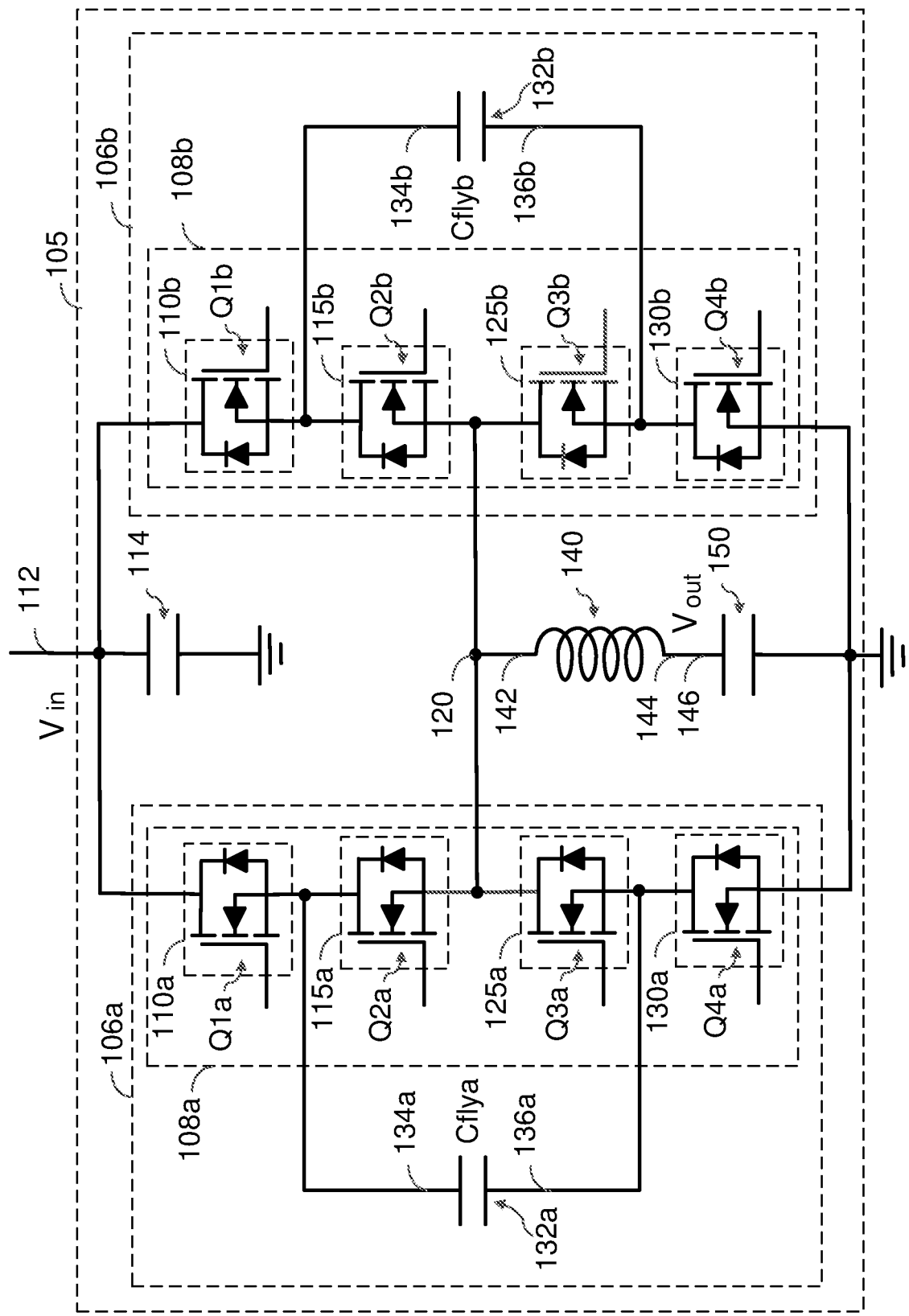
FIG. 14B shows an example of a buck converter including switches implemented with transistors according to certain aspects of the present disclosure.

As discussed above, each of the switches 110a, 115a, 125a, 130a, 110b, 115b, 125b and 130b may be implemented with a respective transistor. In this regard, FIG. 14B shows an example in which each of the switches 110a, 115a, 125a, 130a, 110b, 115b, 125b and 130b includes a respective transistor. More particularly, the first switch 110a includes a first transistor Q1a, the second switch 115a includes a second transistor Q2a, the third switch 125a includes a third transistor Q3a, the fourth switch 130a includes a fourth transistor Q4a, the fifth switch 110b includes a fifth transistor Q1b, the sixth switch 115b includes a sixth transistor Q2b, the seventh switch 125b includes a seventh transistor Q3b, and the eighth switch 130b includes an eighth transistor Q4b. Note that the controller 160 is not shown in FIG. 14B for ease of illustration.

In the example shown in FIG. 14B each of the transistors Q1a, Q2a, Q3a, Q4a, Q1b, Q2b, Q3b, and Q4b is implemented with an n-type field effect transistor (NFET). In this example, the controller 160 closes a switch by inputting a high voltage (e.g., a control value of logic one) to the gate of the respective transistor, which turns on the respective transistor. The controller 160 opens a switch by inputting a low voltage (e.g., a control value of logic zero) to the gate of the respective transistor, which turns off the respective transistor. Note that the connections between the gates of the transistors Q1a, Q2a, Q3a, Q4a, Q1b, Q2b, Q3b, and Q4b and the controller 160 are not explicitly shown in FIG. 14B for ease of illustration. It is to be appreciated that the transistors Q1a, Q2a, Q3a, Q4a, Q1b, Q2b, Q3b, and Q4b may be implemented with other types of transistors.

In this example, the first set of control values (which couple the first fly capacitor 132a between the input 112 and the switch node 120) may include logic values of one, zero, one and zero corresponding to transistors Q1a, Q2a, Q3a and Q4a, respectively. The second set of control values (which couple the first fly capacitor 132 between the switch node 120 and ground) may include logic values of zero, one, zero and one corresponding to transistors Q1a, Q2a, Q3a and Q4a, respectively. The fifth set of control values (which couple the switch node 120 to ground) may include logic values of zero, zero, one and one corresponding to transistors Q1a, Q2a, Q3a and Q4a, respectively. The seventh set of control values (which couple the switch node 120 to the input 112) may include logic values of one, one, zero and zero corresponding to transistors Q1a, Q2a, Q3a and Q4a, respectively.

In this example, the third set of control values (which couple the second fly capacitor 132b between the input 112 and the switch node 120) may include logic values of one, zero, one and zero corresponding to transistors Q1b, Q2b, Q3b and Q4b, respectively. The fourth set of control values (which couple the second fly capacitor 132b between the switch node 120 and ground) may include logic values of zero, one, zero and one corresponding to transistors Q1b, Q2b, Q3b and Q4b, respectively. The sixth set of control values (which couple the switch node 120 to ground) may include logic values of zero, zero, one and one corresponding to transistors Q1b, Q2b, Q3b and Q4b, respectively. The eighth set of control values (which couple the switch node 120 to the input 112) may include logic values of one, one, zero and zero corresponding to transistors Q1b, Q2b, Q3b and Q4b, respectively.

Figure 15:
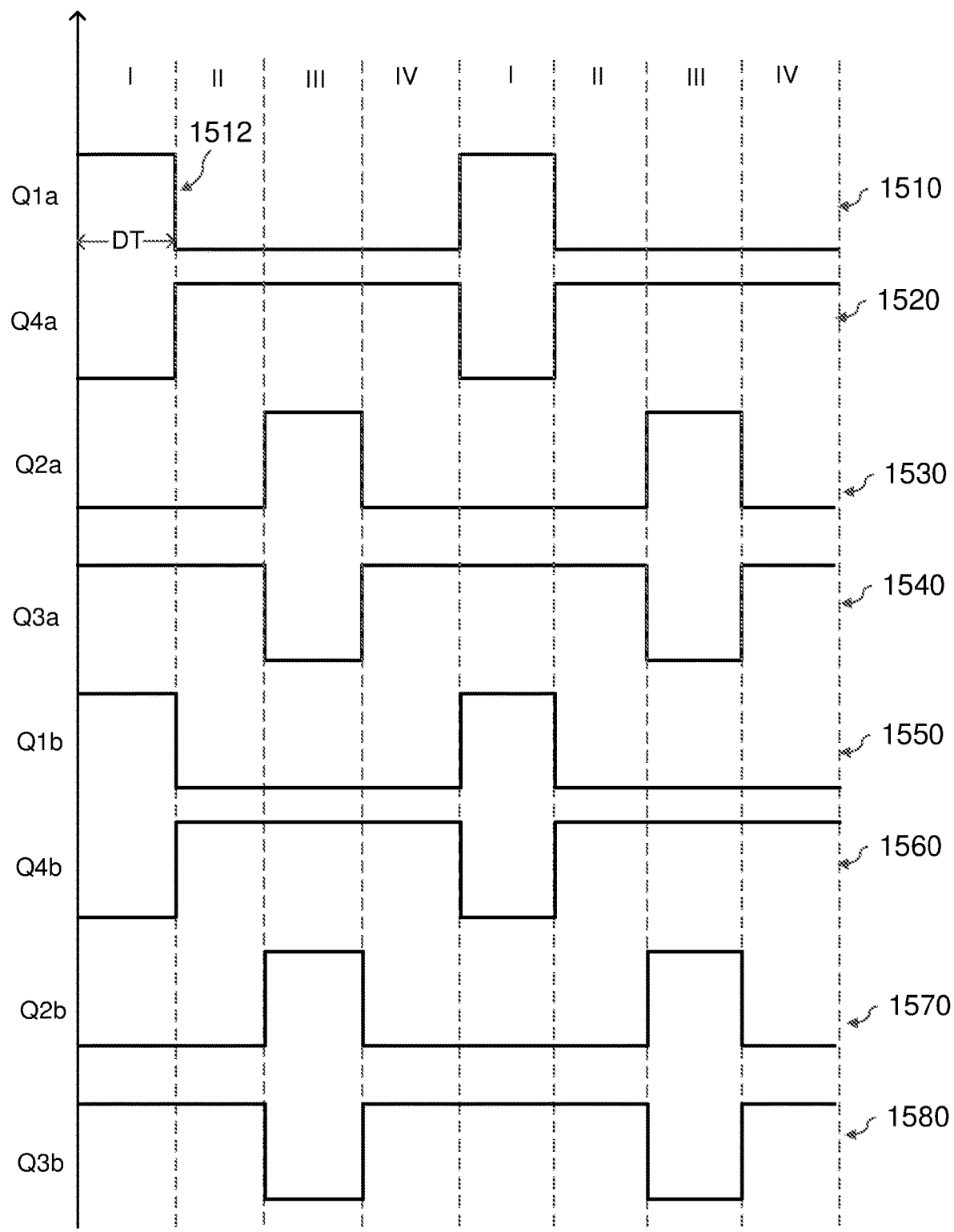
FIG. 15 shows an example of control signals for operating a buck converter in-phase according to aspects of the present disclosure.

FIG. 15 shows an example of control signals that the controller 160 may generate to operate the buck converter 105 in-phase for the case where the duty cycle is less than 50%. In this example, the control signal 1510 is input to the first transistor Q1a, the control signal 1520 is input to the fourth transistor Q4a, the control signal 1530 is input to the second transistor Q2a, and the control signal 1540 is input to the third transistor Q3a. In this example, the control signal 1520 is the complement (i.e., inverse) of the control signal 1510, and the control signal 1540 is the complement (i.e., inverse) of the control signal 1530.

The control signal 1550 is input to the fifth transistor Q1b, the control signal 1560 is input to the eighth transistor Q4b, the control signal 1570 is input to the sixth transistor Q2b, and the control signal 1580 is input to the seventh transistor Q3b. For in-phase operation, the control signals 1550, 1560, 1570 and 1580 may be the same as the control signals 1510, 1520, 1530 and 1540, respectively. This causes the transistors Q1a, Q2a, Q3a and Q4a to operate in phase with the transistors Q1b, Q2b, Q3b and Q4b, respectively. In this example, each control signal is input to the gate of the respective transistor, and a transistor is turned on when the respective control signal is high (e.g., has a control value of logic one), and turned off when the respective control signal is low (e.g., has a control value of logic zero).

During the first phase (labeled "I") of each cycle, the first transistor Q1a, the third transistor Q3a, the fifth transistor Q1b and the seventh transistor Q3b are turned on, and the second transistor Q2a, the fourth transistor Q4a, the sixth transistor Q2b and the eighth transistor Q4b are turned off. As a result, the first and second fly capacitors 132a and 132b are coupled in parallel between the input 112 and the switch node 120, an example of which is shown in FIG. 3A.

During the second phase and the fourth phase (labeled "II" and "IV") of each cycle, the first transistor Q1a, the second transistor Q2a, the fifth transistor Q1b and the sixth transistor Q2b are turned off, and the third transistor Q3a, the fourth transistor Q4a, the seventh transistor Q3b and the eighth transistor Q4b are turned on. As a result, the switch node 120 is coupled to ground, examples of which are shown in FIGS. 3B and 3D.

During the third phase (labeled "III") of each cycle, the first transistor Q1a, the third transistor Q3a, the fifth transistor Q1b and the seventh transistor Q3b are turned off, and the second transistor Q2a, the fourth transistor Q4a, the sixth transistor Q2b and the eighth transistor Q4b are turned on. As a result, the first and second fly capacitors 132a and 132b are coupled in parallel between the switch node 120 and ground, an example of which is shown in FIG. 3C.

Figure 16:
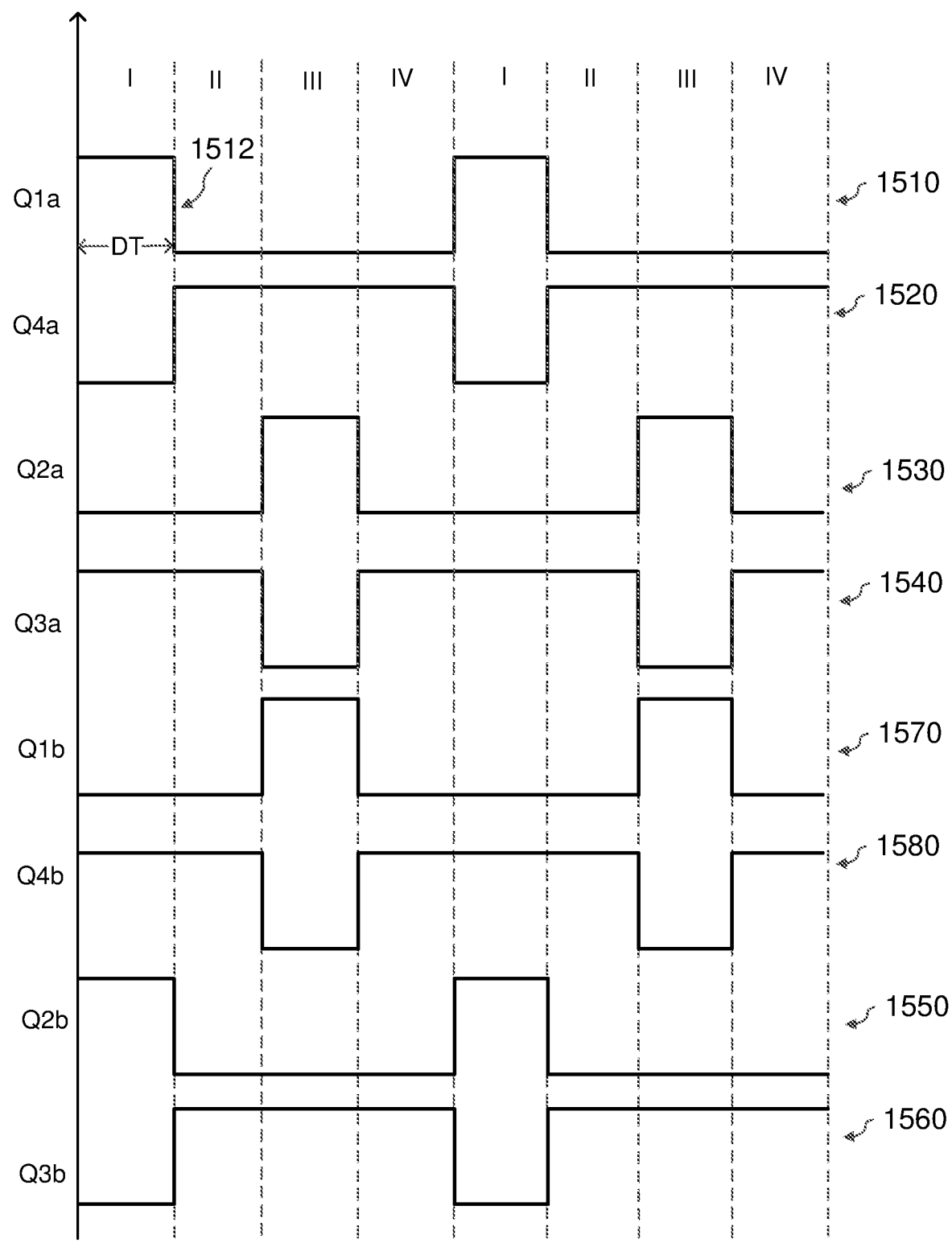
FIG. 16 shows an example of control signals for operating a buck converter out-of-phase according to aspects of the present disclosure.

FIG. 16 shows an example of control signals for operating the buck converter 105 out-of-phase for the case where the duty cycle is less than 50%. In this example, the control signals 1510, 1520, 1530 and 1540 input to the first transistor Q1a, the fourth transistor Q4a, the second transistor Q2a and the third transistor Q3a, respectively, are the same for out-of-phase operation as for in-phase operation discussed above with reference to FIG. 15. Thus, the control signals for transistors Q1a, Q2a, Q3a and Q4a may stay the same for out-of-phase operation and in-phase operation.

The control signals 1550 and 1560 input to the fifth transistor Q1b and the eighth transistor Q4b, respectively, during in-phase operation are input to the sixth transistor Q2b and the seventh transistor Q3b, respectively, during out-of-phase operation. The control signals 1570 and 1580 input to the sixth transistor Q2b and the seventh transistor Q3b, respectively, during in-phase operation are input to the fifth transistor Q1b and the eighth transistor Q4b, respectively, during out-of-phase operation. Thus, switching the buck converter 105 between in-phase operation and out-of-phase operation may be accomplished by swapping the control signals between the fifth transistor Q1b and the sixth transistor Q2b, and swapping the control signals between the eighth transistor Q4b and the seventh transistor Q3b.

During the first phase (labeled "I") of each cycle, the first transistor Q1a, the third transistor Q3a, the sixth transistor Q2b and the eighth transistor Q3b are turned on, and the second transistor Q2a, the fourth transistor Q4a, the fifth transistor Q1b and the seventh transistor Q3b are turned off. As a result, the first and second fly capacitors 132a and 132b are coupled in series between the input 112 and ground, in which the first fly capacitor 132a is between the input 112 and the switch node 120, and the second fly capacitor 132b is between the switch node 120 and ground. An example of this is shown in FIG. 5A.

During the second phase and the fourth phase (labeled "II" and "IV") of each cycle, the first transistor Q1a, the second transistor Q2a, the fifth transistor Q1b and the sixth transistor Q2b are turned off, and the third transistor Q3a, the fourth transistor Q4a, the seventh transistor Q3b and the eighth transistor Q4b are turned on. As a result, the switch node 120 is coupled to ground, examples of which are shown in FIGS. 5B and 5D.

During the third phase (labeled "III") of each cycle, the second transistor Q2a, the fourth transistor Q4a, the fifth transistor Q1b and the seventh transistor Q3b are turned on, and the first transistor Q1a, the third transistor Q3a, the sixth transistor Q2b and the eighth transistor Q4b are turned off. As a result, the first and second fly capacitors 132a and 132b are coupled in series between the input 112 and the switch node 120, in which the second fly capacitor 132b is between the input 112 and the switch node 120, and the first fly capacitor 132a is between the switch node 120 and ground. An example of this is shown in FIG. 5C.

Figure 17:
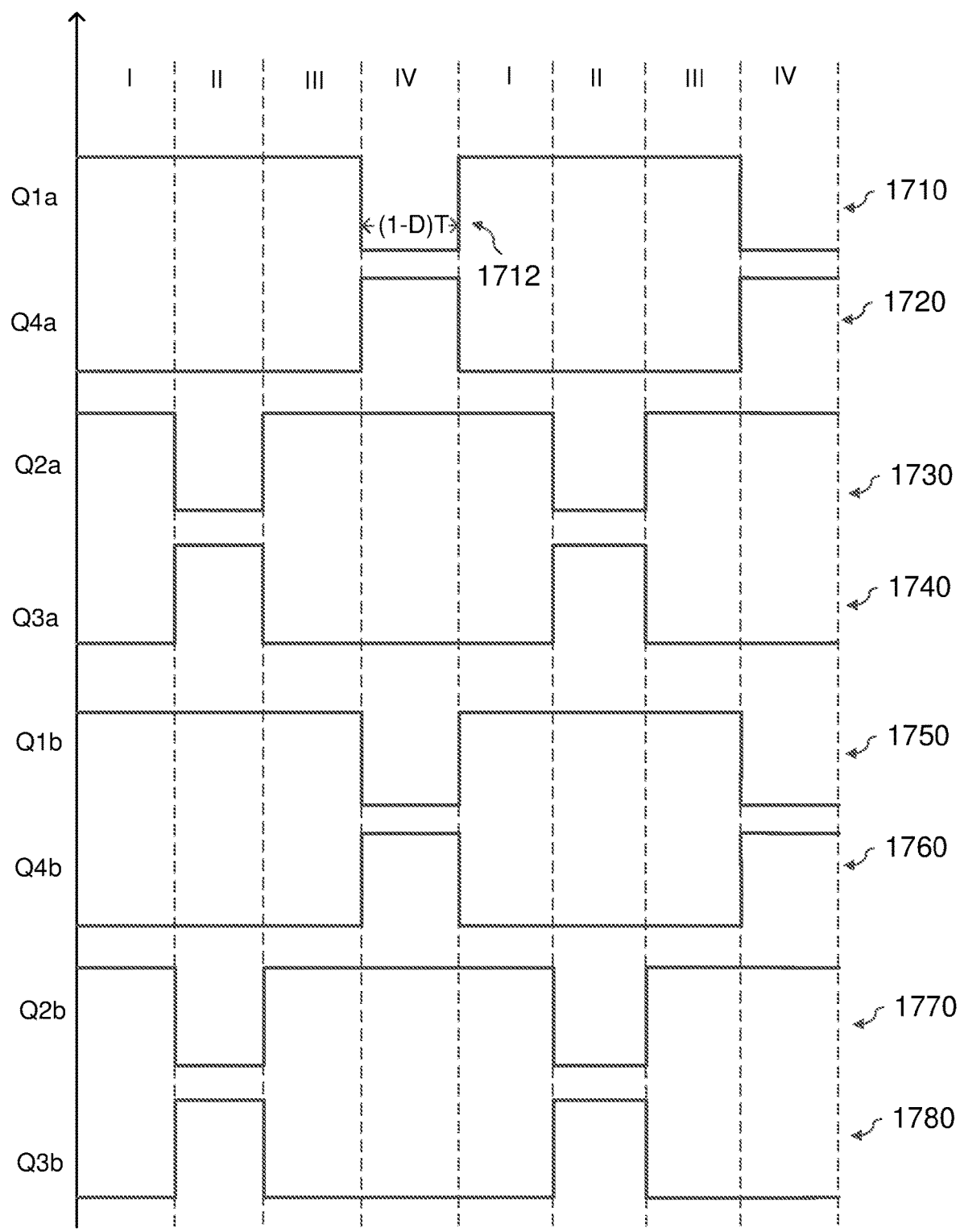
FIG. 17 shows another example of control signals for operating a buck converter in-phase according to aspects of the present disclosure.

FIG. 17 shows an example of control signals that the controller 160 may generate to operate the buck converter 105 in-phase for the case where the duty cycle is greater than 50%. In this example, the control signal 1710 is input to the first transistor Q1a, the control signal 1720 is input to the fourth transistor Q4a, the control signal 1730 is input to the second transistor Q2a, and the control signal 1740 is input to the third transistor Q3a. In this example, the control signal 1720 is the complement (i.e., inverse) of the control signal 1710, and the control signal 1740 is the complement (i.e., inverse) of the control signal 1730.

The control signal 1750 is input to the fifth transistor Q1b, the control signal 1760 is input to the eighth transistor Q4b, the control signal 1770 is input to the sixth transistor Q2b, and the control signal 1780 is input to the seventh transistor Q3b. For in-phase operation, the control signals 1750, 1760, 1770 and 1780 may be the same as the control signals 1710, 1720, 1730 and 1740, respectively. This causes the transistors Q1a, Q2a, Q3a and Q4a to operate in phase with the transistors Q1b, Q2b, Q3b and Q4b, respectively. In this example, each control signal is input to the gate of the respective transistor, and a transistor is turned on when the respective control signal is high (e.g., has a control value of logic one), and turned off when the respective control signal is low (e.g., has a control value of logic zero).

During the first phase and the third phase (labeled "I" and "III") of each cycle, the first transistor Q1a, the second transistor Q2a, the fifth transistor Q1b and the sixth transistor Q2b are turned on, and the third transistor Q3a, the fourth transistor Q4a, the seventh transistor Q3b and the eighth transistor Q4b are turned off. As a result, the switch node 120 is coupled to the input 112 of the buck converter 105, examples of which are shown in FIGS. 7A and 7C.

During the second phase (labeled "II") of each cycle, the first transistor Q1a, the third transistor Q3a, the fifth transistor Q1b and the seventh transistor Q3b are turned on, and the second transistor Q2a, the fourth transistor Q4a, the sixth transistor Q2b and the eighth transistor Q4b are turned off. As a result, the first and second fly capacitors 132a and 132b are coupled in parallel between the input 112 and the switch node 120, an example of which is shown in FIG. 7B.

During the fourth phase (labeled "IV") of each cycle, the first transistor Q1a, the third transistor Q3a, the fifth transistor Q1b and the seventh transistor Q3b are turned off, and the second transistor Q2a, the fourth transistor Q4a, the sixth transistor Q2b and the eighth transistor Q4b are turned on. As a result, the first and second fly capacitors 132a and 132b are coupled in parallel between the switch node 120 and ground, an example of which is shown in FIG. 7D.

Figure 18:
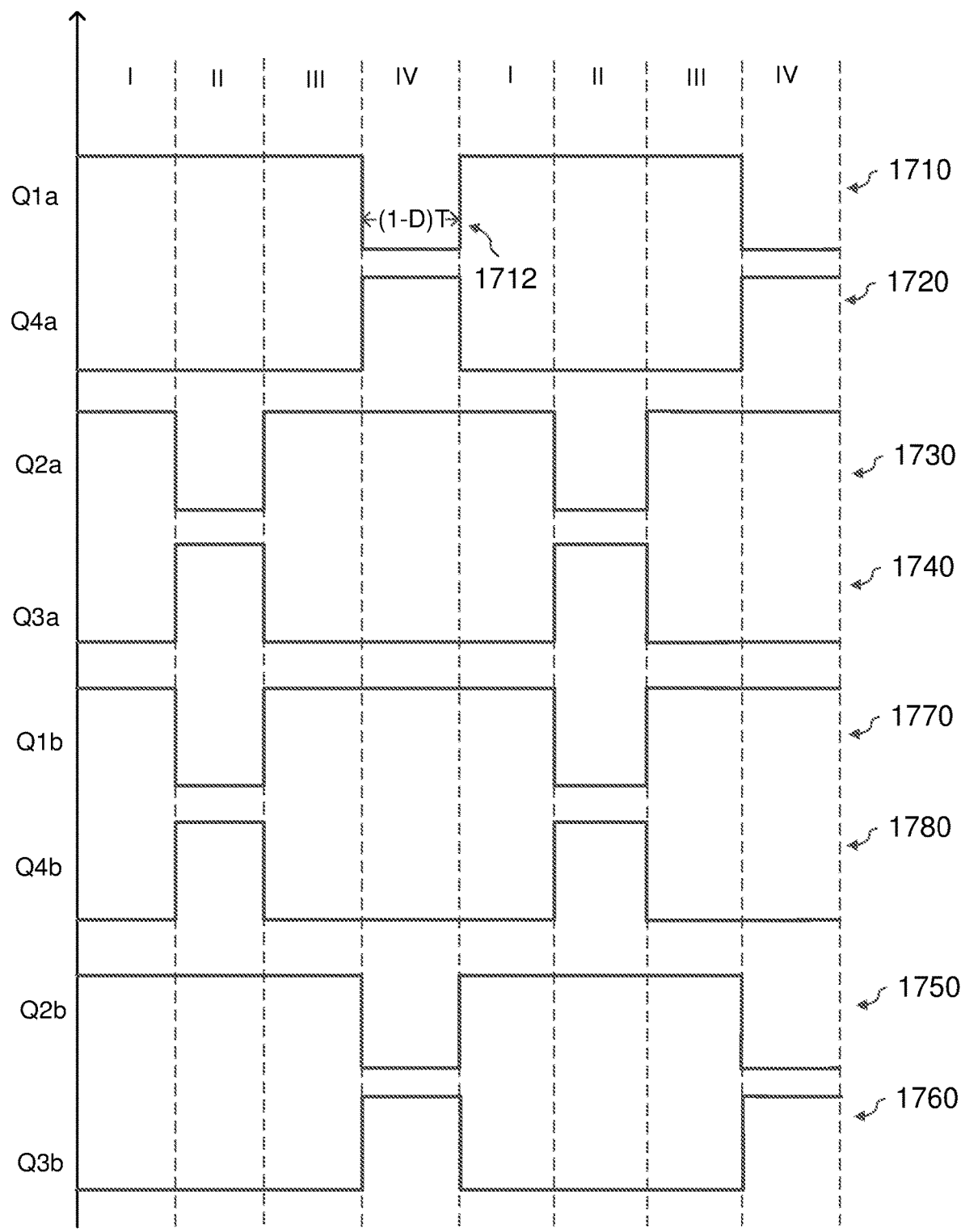
FIG. 18 shows another example of control signals for operating a buck converter out-of-phase according to aspects of the present disclosure.

FIG. 18 shows an example of control signals for operating the buck converter 105 out-of-phase for the case where the duty cycle is greater than 50%. In this example, the control signals 1710, 1720, 1730 and 1740 input to the first transistor Q1a, the fourth transistor Q4a, the second transistor Q2a and the third transistor Q3a, respectively, are the same for out-of-phase operation as for in-phase operation discussed above with reference to FIG. 17. Thus, the control signals for transistors Q1a, Q2a, Q3a and Q4a may stay the same for out-of-phase operation and in-phase operation.

The control signals 1750 and 1760 input to the fifth transistor Q1b and the eighth transistor Q4b, respectively, during in-phase operation are input to the sixth transistor Q2b and the seventh transistor Q3b, respectively, during out-of-phase operation. The control signals 1770 and 1780 input to the sixth transistor Q2b and the seventh transistor Q3b, respectively, during in-phase operation are input to the fifth transistor Q1b and the eighth transistor Q4b, respectively, during out-of-phase operation. Thus, switching the buck converter 105 between in-phase operation and out-of-phase operation may be accomplished by swapping the control signals between the fifth transistor Q1b and the sixth transistor Q2b, and swapping the control signals between the eighth transistor Q4b and the seventh transistor Q3b.

During the first phase and the third phase (labeled "I" and "III") of each cycle, the first transistor Q1a, the second transistor Q2a, the fifth transistor Q1b and the sixth transistor Q2b are turned on, and the third transistor Q3a, the fourth transistor Q4a, the seventh transistor Q3b and the eighth transistor Q4b are turned off. As a result, the switch node 120 is coupled to the input 112 of the buck converter 105, examples of which are shown in FIGS. 9A and 9C.

During the second phase (labeled "II") of each cycle, the first transistor Q1a, the third transistor Q3a, the sixth transistor Q2b and the eighth transistor Q3b are turned on, and the second transistor Q2a, the fourth transistor Q4a, the fifth transistor Q1b and the seventh transistor Q3b are turned off. As a result, the first and second fly capacitors 132a and 132b are coupled in series between the input 112 and ground, in which the first fly capacitor 132a is between the input 112 and the switch node 120, and the second fly capacitor 132b is between the switch node 120 and ground. An example of this is shown in FIG. 9B.

During the fourth phase (labeled "IV") of each cycle, the second transistor Q2a, the fourth transistor Q4a, the fifth transistor Q1b and the seventh transistor Q3b are turned on, and the first transistor Q1a, the third transistor Q3a, the sixth transistor Q2b and the eighth transistor Q4b are turned off. As a result, the first and second fly capacitors 132a and 132b are coupled in series between the input 112 and the switch node 120, in which the second fly capacitor 132b is between the input 112 and the switch node 120 and the first fly capacitor 132a is between the switch node 120 and ground. An example of this is shown in FIG. 9D.

Figure 19A:
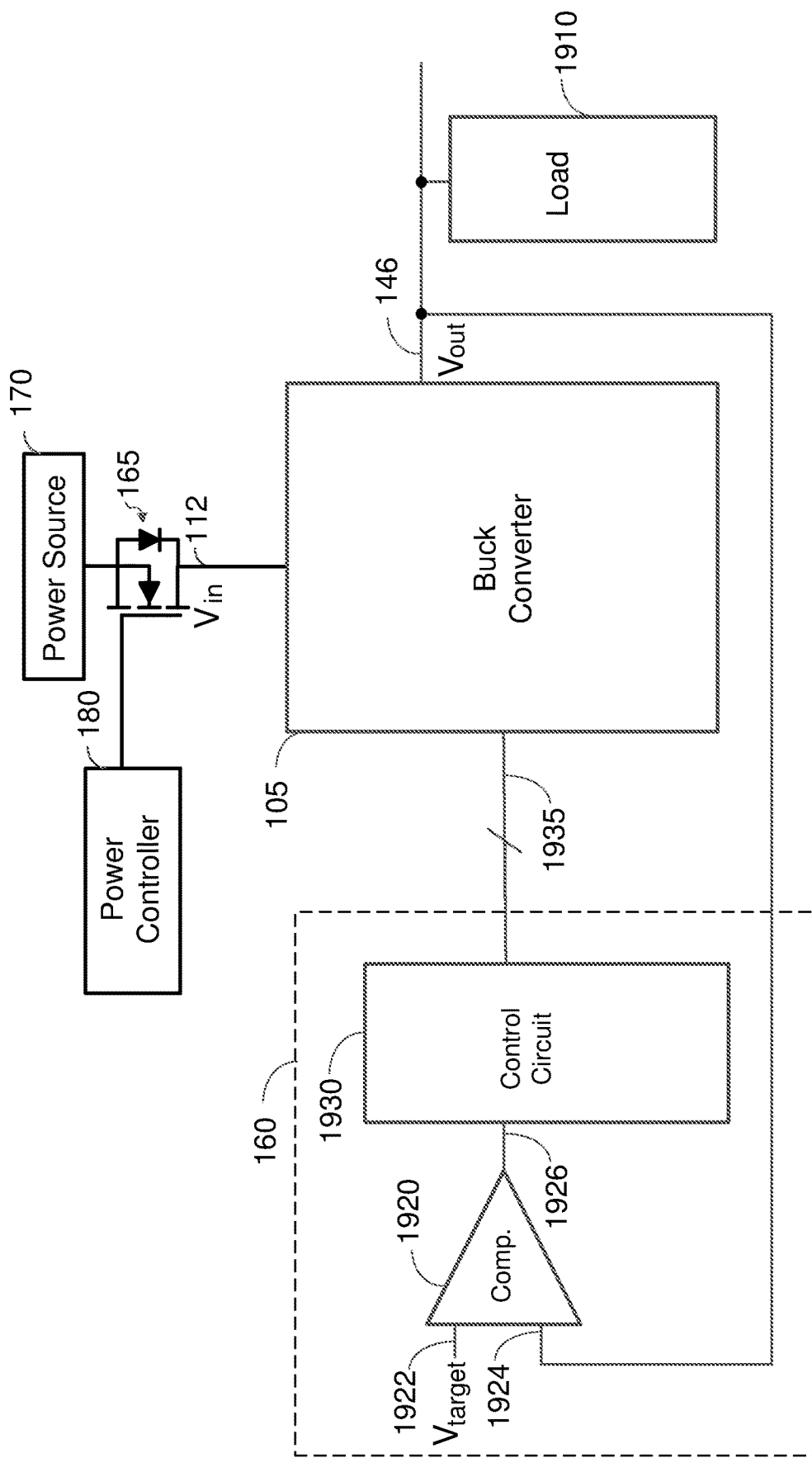
FIG. 19A shows an exemplary implementation of a controller according to aspects of the present disclosure.

FIG. 19A shows an exemplary implementation of the controller 160 according to certain aspects. Details of the buck converter 105 are not shown in FIG. 19A for ease of illustration. In this example, the output 146 of the buck converter 105 is coupled to a load 1910, which receives the output voltage $V_{out}$. The load 1910 may include a battery (not shown) and/or another device.

In this example, the controller 160 includes a comparator 1920 and a control circuit 1930. The comparator 1920 has a first input 1922 configured to receive a target voltage $V_{target}$, a second input 1924 coupled to the output 146 of the buck converter 106, and an output 1926 coupled to the control circuit 1930. In operation, the comparator 1920 compares the output voltage $V_{out}$ of the buck converter 105 with the target voltage $V_{target}$, and outputs a compare signal to the control circuit 1930 indicating whether the output voltage $V_{out}$ of the buck converter 105 is greater than or less than the target voltage $V_{target}$. The comparator 1920 may be implemented with an error amplifier or another type of comparator.

The control circuit 1930 generates control signals 1935 and outputs the control signals 1935 to the buck converter 105 (e.g., via the control paths 162 and 164 shown in FIGS. 1 and 14A), in which each of the controls signals 1935 controls a respective one of the switches (e.g., respective one of the switches 110a, 115a, 125a, 130a, 110b, 115b, 125b, and 130b) in the buck converter 105. The control signals 1935 may switch the switches in the buck converter 105 according to any one of the switching sequences discussed above with reference to FIGS. 3A to 3D, FIGS. 5A to 5B, FIGS. 7A to 7B and FIGS. 9A to 9D to operate the buck converter 105 in-phase and/or out-of-phase.

For the example in which the controller 160 operates the buck converter 105 in-phase with a duty cycle less than 50%, the control signals 1935 may correspond to the exemplary control signals shown in FIG. 15. For the example in which the controller 160 operates the buck converter 105 out-of-phase with a duty cycle less than 50%, the control signals 1935 may correspond to the exemplary control signals shown in FIG. 16. For the example in which the controller 160 operates the buck converter 105 in-phase with a duty cycle greater than 50%, the control signals 1935 may correspond to the exemplary control signals shown in FIG. 17. For the example in which the controller 160 operates the buck converter 105 out-of-phase with a duty cycle greater than 50%, the control signals 1935 may correspond to the exemplary control signals shown in FIG. 18.

In operation, the control circuit 1930 controls the duty cycle of the control signals 1935 (and hence the duty cycle of the buck converter 105) based on the compare signal received from the comparator 1920. More particularly, the control circuit 1930 adjusts the duty cycle based on the compare signal in a direction that reduces the difference between the output voltage $V_{out}$ and the target voltage $V_{target}$. If the compare signal indicates that the output voltage $V_{out}$ of the buck converter 105 is less than the target voltage $V_{target}$, then the control circuit 1930 increases the duty cycle to increase the output voltage $V_{out}$, which reduce the difference between $V_{out}$ and $V_{target}$ in this case. If the compare signal indicates that the output voltage $V_{out}$ of the buck converter 105 is greater than the target voltage $V_{target}$, then the control circuit 1930 reduces the duty cycle to decrease the output voltage $V_{out}$, which reduce the difference between $V_{out}$ and $V_{target}$ in this case. In this manner, the control circuit 1930 dynamically adjusts the duty cycle of the buck converter 105 to keep the output voltage $V_{out}$ of the buck converter 105 close to the target voltage.

Figure 19B:
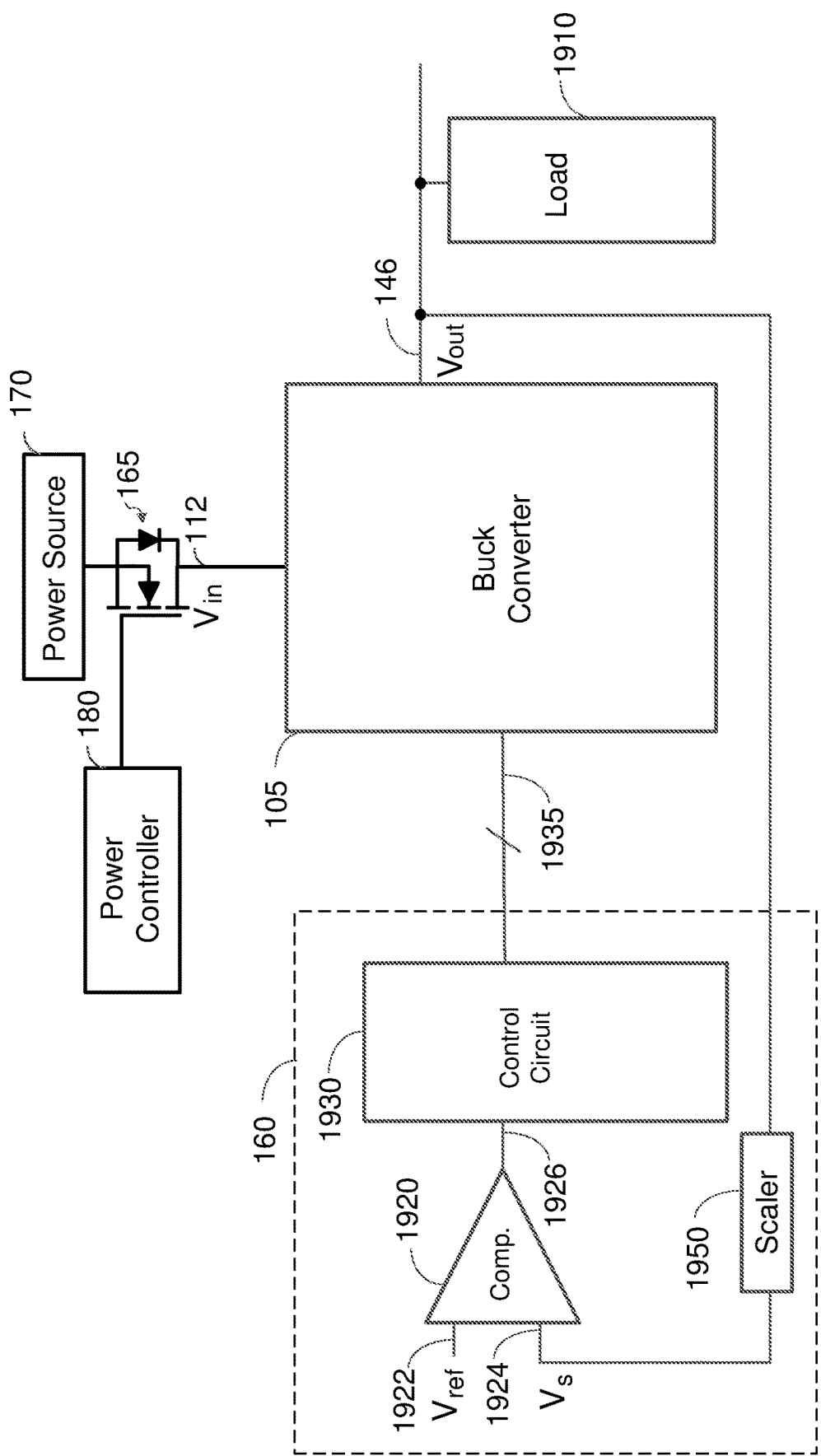
FIG. 19B shows another exemplary implementation of a controller according to aspects of the present disclosure.

FIG. 19B shows an exemplary implementation in which the controller 160 includes a voltage scaler 1950 configured to scale the output voltage $V_{out}$ of the buck converter 105 to generate a scaled voltage $V_s$. In this example, the comparator 1920 compares the scaled voltage $V_s$ with a reference voltage $V_{ref}$ to generate the compare signal discussed above. The scaled voltage $V_s$ is approximately equal to the output voltage $V_{out}$ times a scaling factor of the scaler 1950. In this example, the target voltage $V_{target}$ is approximately equal to the reference voltage $V_{ref}$ divided by the scaling factor. Thus, in this example, the target voltage $V_{target}$ may be programmed by programming the scaling factor of the voltage scaler 1950. In one example, the voltage scaler 1950 may be implemented with a resistor voltage divider, which may include a variable resistor to program the scaling factor. In this example, the compare signal indicates whether the output voltage $V_{out}$ is greater than or less than the target voltage.

Figure 20:
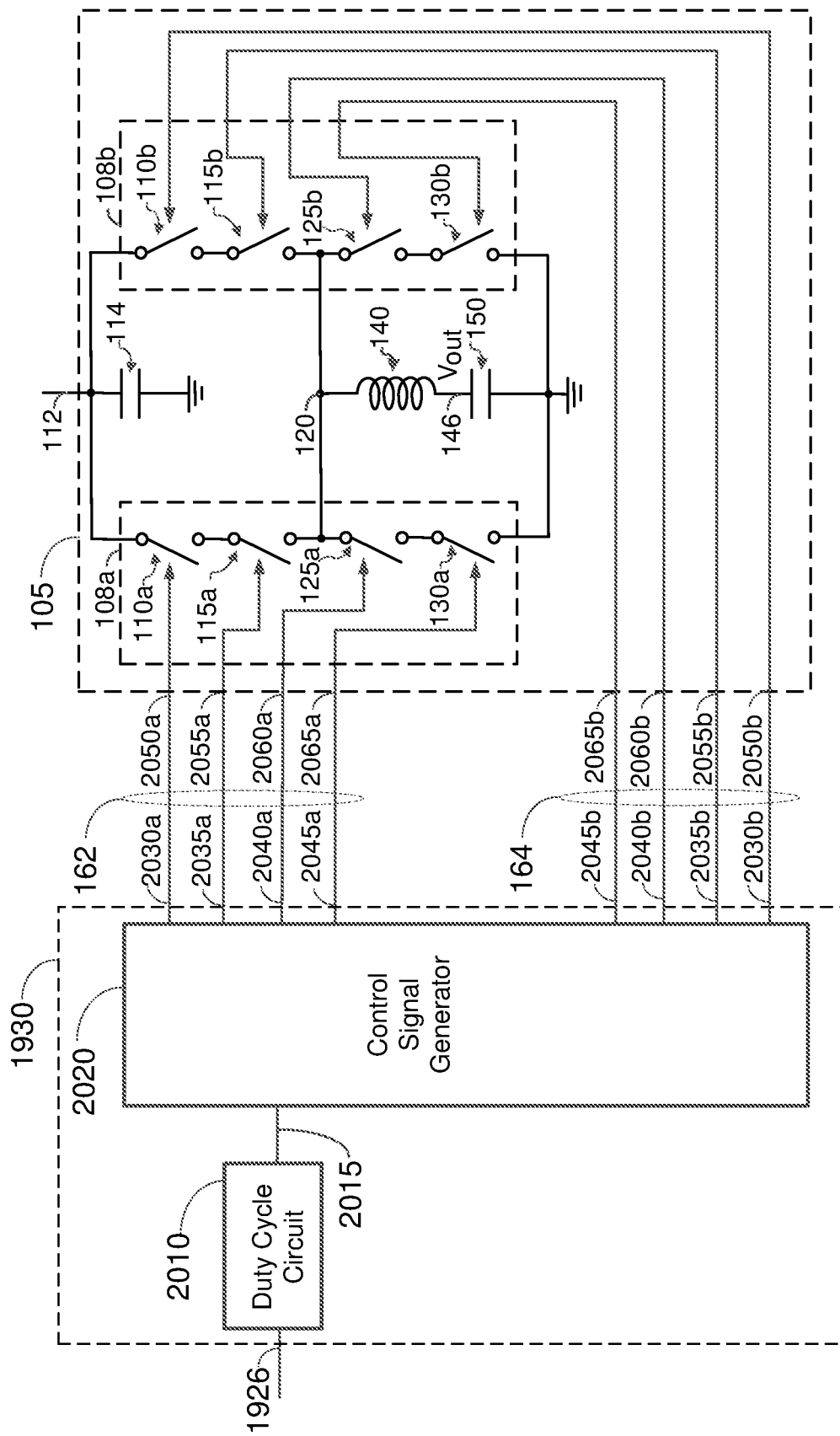
FIG. 20 shows an exemplary implementation of a control circuit according to aspects of the present disclosure.

FIG. 20 shows an exemplary implementation of the control circuit 1930 according to certain aspects. In this example, the control circuit 1930 includes a duty cycle circuit 2010 and a control signal generator 2020. The control signal generator 2020 is configured to generate the control signals for the switches in the buck converter 105. As discussed further below, the duty cycle circuit 2010 is configured to receive the compare signal from the comparator 1920 (not shown in FIG. 20), and control the duty cycle of the control signals output by the control signal generator 2020 based on the compare signal. Note that the fly capacitors 132a and 132b are not shown in FIG. 20 for ease of illustration.

In this example, the control signal generator 2020 includes a first output 2030a coupled to a first control input 2050a of the buck converter 105, a second output 2035a coupled to a second control input 2055a of the buck converter 105, a third output 2040a coupled to a third control input 2060a of the buck converter 105, and a fourth output 2045a coupled to a fourth control input 2065a of the buck converter 105. The first control input 2050a, the second control input 2055a, the third control input 2060a, and the fourth control input 2065a are coupled to the first switch 110a, the second switch 115a, the third switch 125a, and the fourth switch 130a, respectively. For the example in which the switches are implemented with transistors, the first control input 2050a, the second control input 2055a, the third control input 2060a, and the fourth control input 2065a may be coupled to the gate of the first transistor Q1a, the gate of the second transistor Q2a, the gate of the third transistor Q3a, and the gate of the fourth transistor Q4a, respectively. Note that the fly capacitors 132a and 132b are not shown in FIG. 20 for ease of illustration. As shown in FIG. 20, each of the outputs 2030a, 2035a, 2040a, and 2045a may be coupled to the respective input 2050a, 2055a, 2060a and 2065a via a respective control line of control path 162.

The control signal generator 2020 also includes a fifth output 2030b coupled to a fifth control input 2050b of the buck converter 105, a sixth output 2035b coupled to a sixth control input 2055b of the buck converter 105, a seventh output 2040b coupled to a seventh control input 2060b of the buck converter 105, and an eighth output 2045b coupled to an eighth control input 2065b of the buck converter 105. The fifth control input 2050b, the sixth control input 2055b, the seventh control input 2060b, and the eighth control input 2065b are coupled to the fifth switch 110b, the sixth switch 115b, the seventh switch 125b, and the eighth switch 130b, respectively. For the example in which the switches are implemented with transistors, the fifth control input 2050b, the sixth control input 2055b, the seventh control input 2060b, and the eighth control input 2065b may be coupled to the gate of the fifth transistor Q1b, the gate of the sixth transistor Q2b, the gate of the seventh transistor Q3b, and the gate of the eighth transistor Q4b, respectively. As shown in FIG. 20, each of the outputs 2030b, 2035b, 2040b, and 2045b may be coupled to the respective input 2050b, 2055b, 2060b and 2065b via a respective control line of control path 164.

In operation, the control signal generator 2020 generates the control signals 1935 discussed above. Each of the control signal controls the on/off state of the respective one of the switches 110a, 115a, 125a, 130a, 110b, 115b, 125b, and 130b (i.e., controls whether the respective one of the switches is closed or open). In this regard, the control signal generator 2020 outputs each of the control signals to the control input of the buck converter 105 coupled to the respective switch. For example, the control signal generator 2020 outputs the control signal for the first switch 110a to the first control input 2050a, outputs the control signal for the second switch 115a to the second control input 2055a, and so forth. As discussed above, the control signals may correspond to the control signals illustrated in any one of FIGS. 15 to 18 depending, for example, on whether the controller 160 operates the buck converter 105 in-phase or out-of-phase and whether the duty cycle is less than or greater than 50%.

As discussed above, the duty cycle circuit 2010 is configured to control the duty cycle of the control signals (and hence the duty cycle of the buck converter 105) based on the compare signal from the comparator 1920. In one example, the duty cycle circuit 2010 may generate a periodic pulse signal including one pulse per cycle of the buck converter 105. The duty cycle circuit 2010 may then output the pulse signal to the control signal generator 2020, in which the control signal generator 2020 generates the control signals for the buck converter 105 based on the pulse signal. In this example, the duty cycle circuit 2010 controls the duty cycle by controlling the pulse width of the pulse signal. This may be explained by way of the following examples.

For the case where the duty cycle is less than 50%, the pulse signal may correspond to the control signal 1510 in FIG. 15, which has a positive pulse 1512. In this example, the pulse width is approximately equal to DT where D is the duty cycle and T is the period of one cycle. As a result, the duty cycle is approximately equal to the pulse width of the pulse signal (i.e., control signal 1510 in this example) divided by the period. Thus, the duty cycle may be adjusted by adjusting the pulse width. In this example, the duty cycle circuit 2010 may increase the duty cycle (e.g., when the compare signal indicates $V_{out}<V_{target}$) by increasing the pulse width. The duty cycle circuit 2010 may decrease the duty cycle (e.g., when the compare signal indicates $V_{out}>V_{target}$) by decreasing the pulse width. In this example, the duty cycle circuit 2010 may be implemented with a pulse width modulator or another type of circuit.

In this example, the control signal generator 2020 may then generate (i.e., derive) the other control signals based on the control signal 1510. For example, the control signal generator 2020 may generate the control signal 1520 by inverting the control signal 1510 (e.g., using an inverter). The control signal generator 2020 may generate control signal 1530 by shifting the control signal 1510 in time by half a period (i.e., 0.5T), and generate control signal 1540 shifting the control signal 1520 in time by half a period (i.e., 0.5T). Thus, the control signal generator 2020 may generate the control signals 1520, 1530 and 1540 based on the control signal 1510 (which corresponds to the pulse signal in this example) by performing inverting and time-shifting functions. In this example, the control signals 1550, 1560, 1570 and 1580 may be copies of the control signals 1510, 1520, 1530 and 1540, respectively.

For the case where the duty cycle is greater than 50%, the pulse signal may correspond to the control signal 1710 in FIG. 17, which has a negative pulse 1712. In this example, the pulse width is approximately equal to (1-D)T where D is the duty cycle and T is the period of one cycle. Similar to the case where the duty cycle is less than 50%, the duty cycle circuit 2010 adjusts the duty cycle by adjusting the pulse width of the control signal 1710 (which corresponds to the pulse signal in this example).

The control signal generator 2020 may then generate (i.e., derive) the other control signals based on the control signal 1710. For example, the control signal generator 2020 may generate the control signal 1720 by inverting the control signal 1710 (e.g., using an inverter). The control signal generator 2020 may generate the control signal 1730 by shifting the control signal 1710 in time by half a period (i.e., 0.5T), and generate the control signal 1740 by shifting the control signal 1720 in time by half a period (i.e., 0.5T). Thus, the control signal generator 2020 may generate the control signals 1720, 1730 and 1740 based on the control signal 1710 (which corresponds to the pulse signal in this example) by performing inverting and time-shifting functions. In this example, the control signals 1750, 1760, 1770 and 1780 may be copies of the control signals 1710, 1720, 1730 and 1740, respectively.

Figure 21:
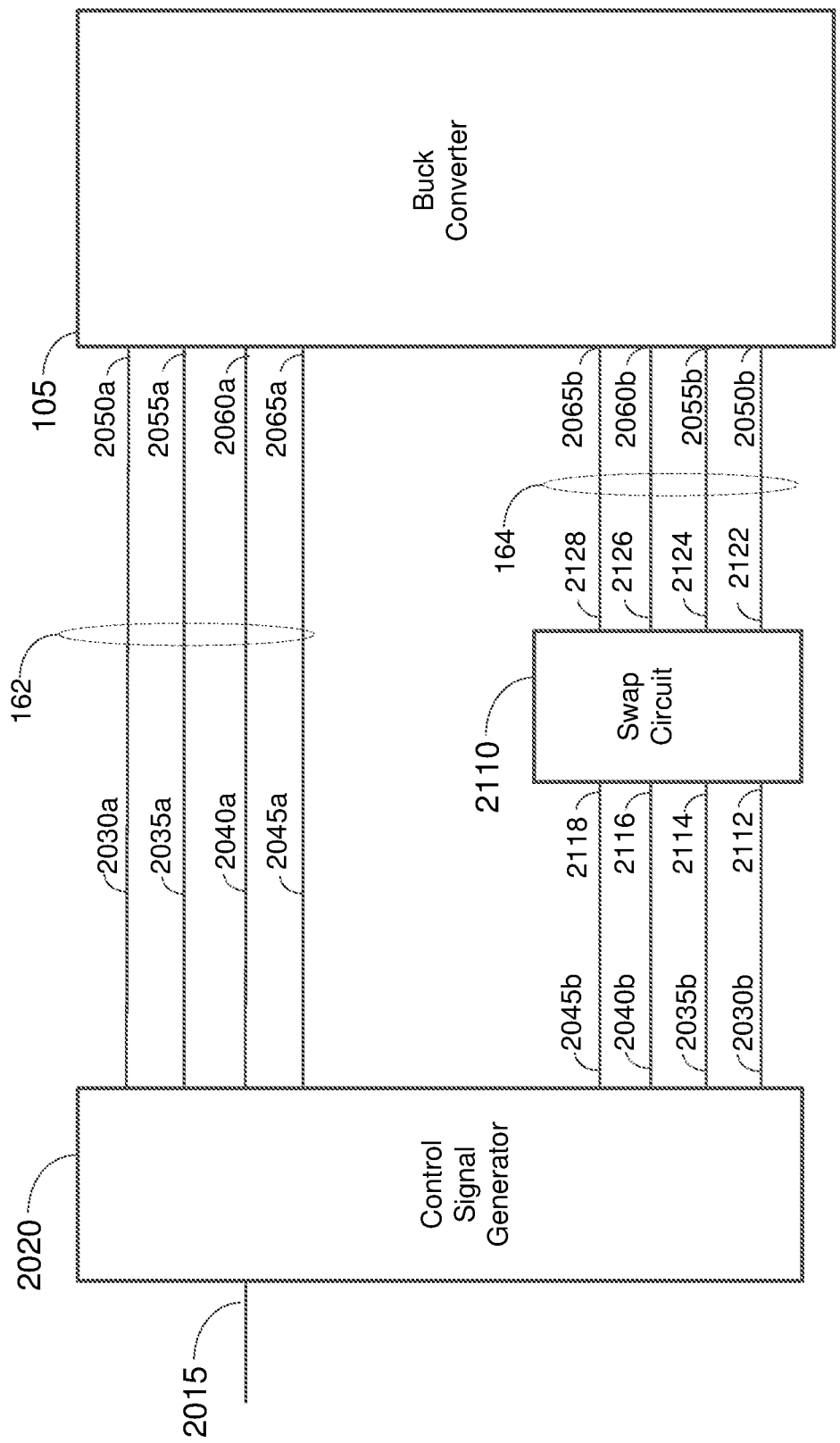
FIG. 21 shows an example of a controller including a swap circuit for mix mode operation according to aspects of the present disclosure.

As discussed above the controller 160 may switch the buck converter 105 between in-phase operation and out-of-phase operation in mix mode by swapping the control signals to the switches in the second switching network 108b of the buck converter 105. In this regard, FIG. 21 shows an example in which the controller 160 includes a swap circuit 2110 between the control signal generator 2020 and the buck converter 105. The swap circuit 2110 includes a first input 2112, a second input 2114, a third input 2116 and a fourth input 2118 coupled to the fifth output 2030b, the sixth output 2035b, the seventh output 2040b and the eighth output 2045b of the control signal generator 2020, respectively. The swap circuit 2110 also includes a first output 2122, a second output 2214, a third output 2216 and a fourth output 2218 coupled to the fifth control input 2050b, the sixth control input 2055b, the seventh control input 2065b and the eighth control input 2065b of the buck converter 105, respectively.

In certain aspects, the swap circuit 2110 is configured to selectively couple each of the inputs 2112, 2114, 2116 and 2118 to one of the outputs 2122, 2124, 2126 and 2128 based on whether the controller 160 is operating the buck converter 105 in-phase or out-of-phase. In one example, the first input 2112 and the second input 2114 of the swap circuit 2110 may receive the control signals 1550 and 1570, respectively. In this example, in an in-phase mode, the swap circuit 2110 couples the first input 2112 and the second input 2114 to the first output 2122 and the second output 2124, respectively, such that the control signal 1550 is input to the fifth transistor Q1b and the control signal 1570 is input to the sixth transistor Q2b. In an out-of-phase mode, the swap circuit 2110 couples the first input 2112 and the second input 2114 to the second output 2124 and the first output 2122, respectively, such that the control signal 1550 is input to the sixth transistor Q2b and the control signal 1570 is input to the fifth transistor Q1b.

Also, in this example, the third input 2116 and the fourth input 2118 of the swap circuit 2110 may receive the control signals 1560 and 1580, respectively. In this example, an in-phase mode, the swap circuit 2110 couples the third input 2116 and the fourth input 2118 to the fourth output 2128 and the third output 2126, respectively, such that the control signal 1560 is input to the eighth transistor Q4b and the control signal 1580 is input to the seventh transistor Q3b. In out-of-phase mode, the swap circuit 2110 couples the third input 2116 and the fourth input 2118 to the third output 2126 and the fourth output 2128, respectively, such that the control signal 1580 is input to the fourth transistor Q4b and the control signal 1560 is input to the seventh transistor Q3b.

Thus, in this example, the swap circuit 2110 switches the buck converter 105 between in-phase operation and out-of-phase operation (e.g., for mix mode operation) by swapping the control signals between the fifth transistor Q1b and the sixth transistor Q2b, and swapping the control signals between the eighth transistor Q4b and the seventh transistor Q3b. In this regard, the swap circuit 2110 may switch between in-phase mode and out-of-phase mode to operate the buck converter in mix mode operation. For example, the swap circuit 2110 may operate in the in-phase mode for one cycle out of every N cycles and operate in the out-of-phase mode in N−1 cycles out of every N cycles, where the N cycles may be consecutive cycles of the buck converter 105. The swap circuit 2110 may be implemented with a crossbar switch, multiplexers, etc.

Figure 22:
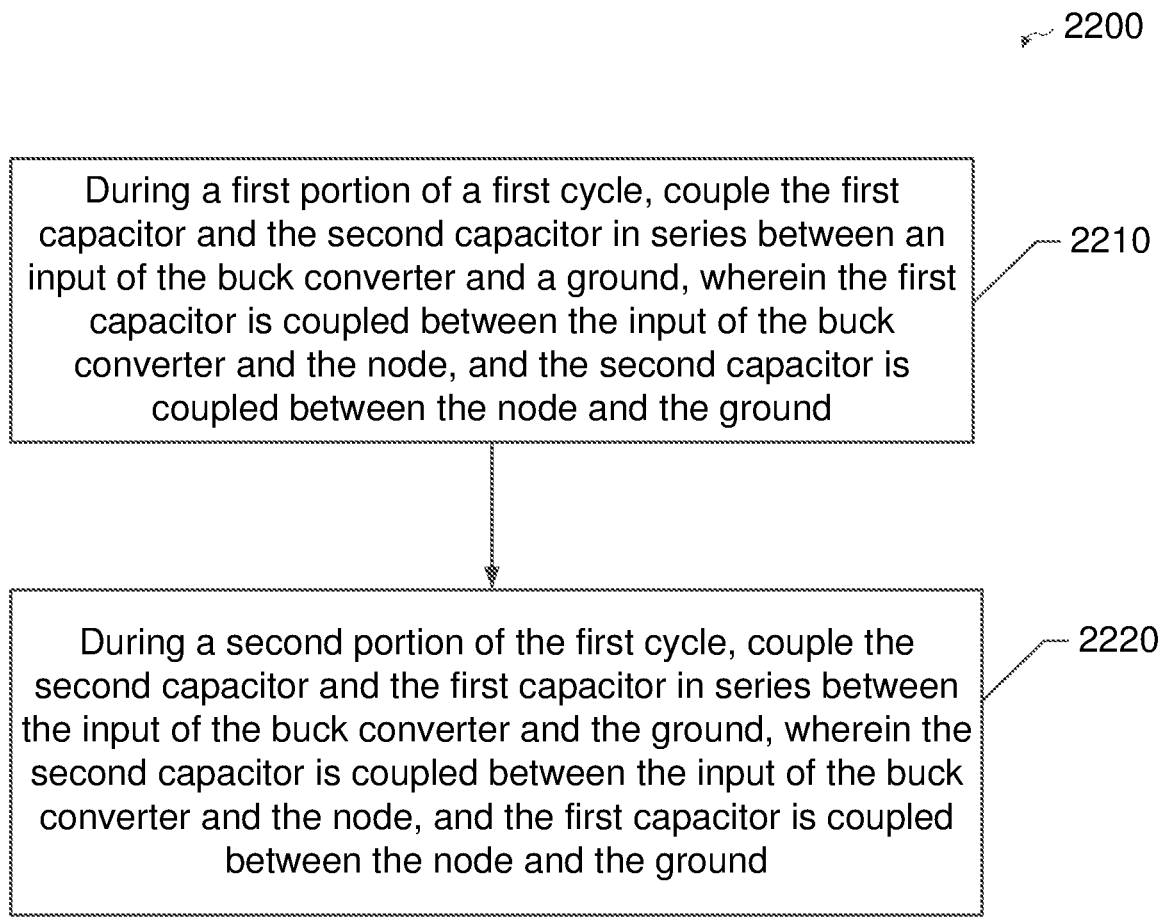
FIG. 22 is a flowchart illustrating a method of operating a buck converter according to certain aspects of the present disclosure.

FIG. 22 is a flowchart illustrating a method 2200 of operating a buck converter according to aspects of the present disclosure. The buck converter (e.g., buck converter 105) includes a first capacitor (e.g., first fly capacitor 132a), a second capacitor (e.g., second fly capacitor 132b), and an inductor (e.g., inductor 140) coupled between a node (e.g., switch node 120) and an output of the buck converter.

At block 2210, during a first portion of a first cycle, the first capacitor and the second capacitor are coupled in series between an input of the buck converter and a ground, wherein the first capacitor is coupled between the input of the buck converter and the node, and the second capacitor is coupled between the node and the ground. Examples of the first capacitor and the second capacitor coupled in series are shown in FIGS. 5A and 9B. The first portion of the first cycle may correspond to the first portion 1050 in FIG. 10B or the first portion 1155 in FIG. 11.

At block 2220, during a second portion of the first cycle, the second capacitor and the first capacitor are coupled in series between the input of the buck converter and the ground, wherein the second capacitor is coupled between the input of the buck converter and the node, and the first capacitor is coupled between the node and the ground. Examples of the second capacitor and the first capacitor coupled in series are shown in FIGS. 5C and 9D. The second portion of the first cycle may correspond to the second portion 1060 in FIG. 10B or the second portion 1165 in FIG. 11B. The second portion of the first cycle may follow or precede the first portion of the first cycle.

The method 2200 may optionally include, during a first portion of a second cycle, coupling the first capacitor and the second capacitor in parallel between the input of the buck converter and the node, and, during a second portion of the second cycle, coupling the first capacitor and the second capacitor in parallel between the node and the ground. Examples of the first capacitor and the second capacitor coupled in parallel between the input of the buck converter and the node are shown in FIGS. 3A and 7B. Examples of the first capacitor and the second capacitor coupled in parallel between the node and ground are shown in FIGS. 3C and 7D.

Figure 23:
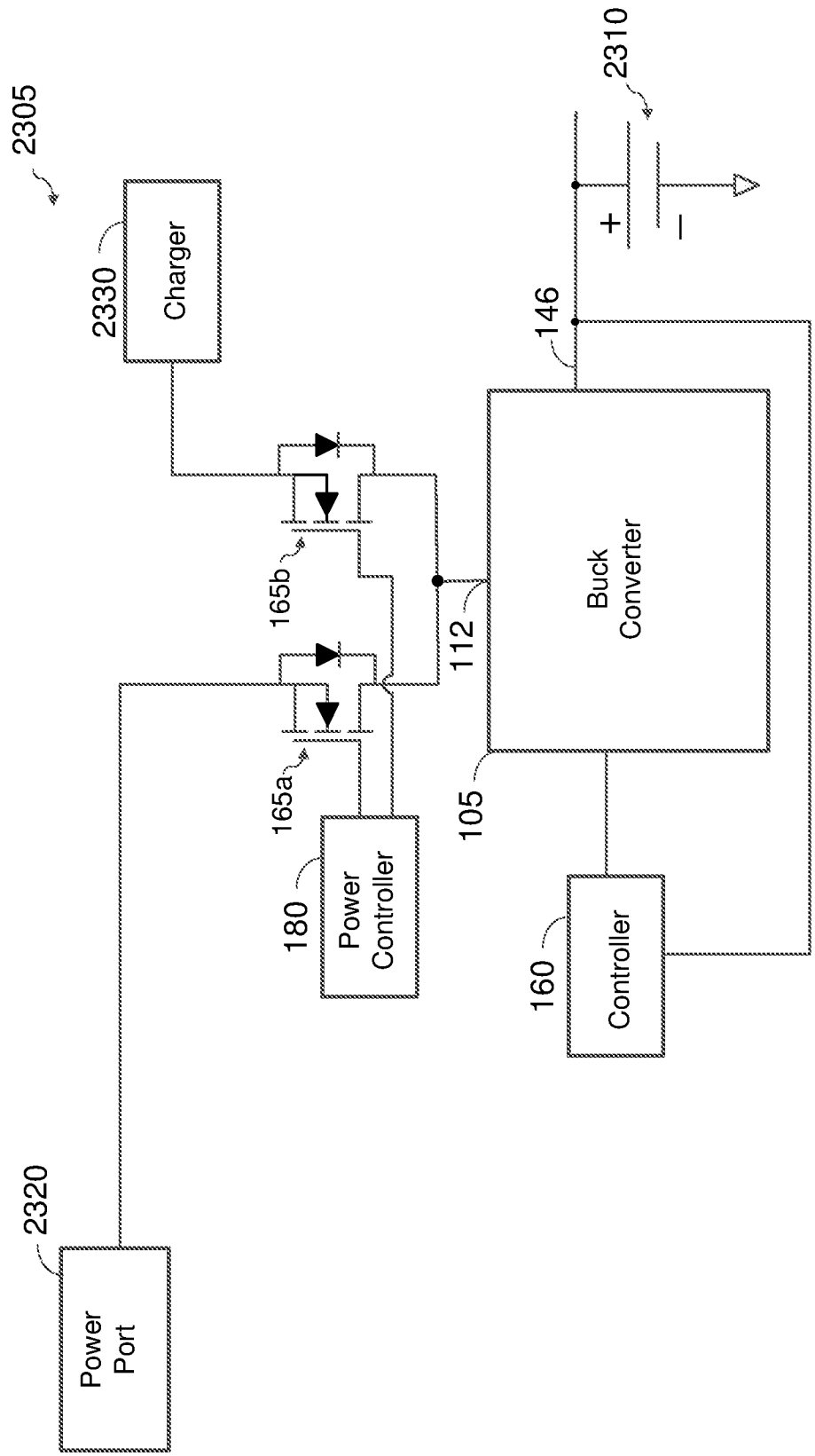
FIG. 23 shows an example of a system including a buck converter according to certain aspects of the present disclosure.

FIG. 23 shows a block diagram of an exemplary system 2305 according to certain aspects of the present disclosure. The system 2305 may be used to supply power in a mobile device (e.g., handset, laptop, etc.) or another type of device. In this example, the system 2305 includes a power port 2320, a charger 2330 (e.g., a wireless charger), a first power transistor 165a, a second power transistor 165b, the power controller 180, the buck converter 105, the controller 160, and a rechargeable battery 2310 (which may correspond to the load 1910 in FIG. 19). It is to be appreciated that FIG. 23 is not drawn to scale, and that the elements of the system 2305 may be laid out differently than shown in FIG. 23.

The power port 2320 may be coupled to a power source (not shown) for receiving power from the power source. In one example, the power source may be a universal serial bus (USB) power source. The USB power source may have an output voltage in the range of 5 to 25 volts. In one example, the power port 2320 may be detachably coupled to the power source. In this disclosure, the term "detachably" means that a user can easily couple or decouple the power source from the power port 2320. The power port 2320 may also be referred to as a power connector or another term. The charger 2330 may be a wireless charger that is wirelessly coupled (e.g., inductively coupled) to an external power source to receive power from the external power source.

The first power transistor 165a is coupled between the power port 2320 and the input 112 of the buck converter 105, and the second power transistor 165b is coupled between the charger 2330 and the input 112 of the buck converter 105. The power controller 180 selectively turns on the first power transistor 165a or the second power transistor 165b depending on which power source is being used for the buck converter 105. For example, the power controller 180 may turn on the first power transistor 165a and turn off the second power transistor 165b when the buck converter 105 is to receive power from a power source (e.g., USB power source) coupled to the power port 2320. The power controller 180 may turn on the second power transistor 165b and turn off the first power transistor 165a when the buck converter 105 is to receive power from the charger 2330, which may be a wireless charger that wirelessly receives power from an external power source.

The output 146 of the buck converter 105 is coupled to the battery 2310. The buck converter 105 is configured to step down the input voltage $V_{in}$ at the input 112 to a lower output voltage $V_{out}$ to charge the battery 2310. The controller 160 is configured to control switching in the buck converter 105 according to any one or more of the aspects of the present disclosure discussed above. In certain aspects, the controller 160 is configured to adjust the duty cycle of the buck converter 105 to maintain the output voltage $V_{out}$ at approximately the target voltage $V_{target}$ (e.g., a voltage for charging the battery 2310). To do this, the controller 160 may monitor the output voltage $V_{out}$ of the buck converter 105 and adjusts the duty cycle based on the monitored output voltage $V_{out}$ to keep the monitored output voltage $V_{out}$ close to the target voltage $V_{target}$. The battery 2310 may be coupled to one or more devices (not shown) for providing power to the one or more devices. The one or more devices may include a system on a chip (SoC), which may include one or more one or more processors, memory, a modem and/or other circuits integrated on a chip.

It is to be appreciated that the present disclosure is not limited to the exemplary terms used above to describe aspects of the present disclosure, and that the present disclosure covers equivalent terms. For example, it is to be appreciated that the control signal generator 2020 may also be referred to as a driver, a switch controller, or another term. In another example, it is to be appreciated that the buck converter 105 may also be referred to as a step-down converter, a switching regulator, or another term.

The controller 160, the duty cycle circuit 2010, and the control signal generator 2020 discussed above may be implemented with a general-purpose processor, a digital signal processor (DSP), an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures. As used herein, the term "approximately" means within 10 percent of the stated value (e.g., between 90 percent and 110 percent of the stated value).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method of operating a buck converter, wherein the buck converter includes a first capacitor, a second capacitor, and an inductor coupled between a node and an output of the buck converter, the method comprising:
    during a first portion of a first cycle, coupling the first capacitor between an input of the buck converter and the node, and coupling the second capacitor between the node and a ground;
    during a second portion of the first cycle, coupling the second capacitor between the input of the buck converter and the node, and coupling the first capacitor between the node and the ground;
    during a first portion of a second cycle, coupling the first capacitor and the second capacitor in parallel between the input of the buck converter and the node; and
    during a second portion of the second cycle, coupling the first capacitor and the second capacitor in parallel between the node and the ground.

2. The method of claim 1, further comprising, during a third portion of the first cycle, coupling the node to the ground.

3. The method of claim 2, wherein the third portion of the first cycle is between the first portion of the first cycle and the second portion of the first cycle.

4. The method of claim 1, further comprising, during a third portion of the first cycle, coupling the node to the input of the buck converter.

5. The method of claim 4, wherein the third portion of the first cycle is between the first portion of the first cycle and the second portion of the first cycle.

6. The method of claim 1, further comprising:
    during a third portion of the first cycle, coupling the node to the ground; and
    during a third portion of the second cycle, coupling the node to the ground.

7. The method of claim 1, further comprising:
    during a third portion of the first cycle, coupling the node to the input of the buck converter; and
    during a third portion of the second cycle, coupling the node to the input of the buck converter.

8. The method of claim 1, wherein:
    the buck converter includes:
        a first switch and a second switch coupled in series between the input of the buck converter and the node;
        a third switch and a fourth switch coupled in series between the node and the ground;
        a fifth switch and a sixth switch coupled in series between the input of the buck converter and the node; and
        a seventh switch and an eighth switch coupled in series between the node and the ground;
    a first terminal of the first capacitor is coupled between the first switch and the second switch;
    a second terminal of the first capacitor is coupled between the third switch and the fourth switch;
    a first terminal of the second capacitor is coupled between the fifth switch and the sixth switch;
    a second terminal of the second capacitor is coupled between the seventh switch and the eighth switch; and
    coupling the first capacitor between the input of the buck converter and the node, and coupling the second capacitor between the node and the ground comprises:
        closing the first switch, the third switch, the sixth switch, and the eighth switch; and
        opening the second switch, the fourth switch, the fifth switch, and the seventh switch.

9. The method of claim 8, wherein coupling the second capacitor between the input of the buck converter and the node, and coupling the first capacitor between the node and the ground:
    closing the second switch, the fourth switch, the fifth switch, and the seventh switch; and
    opening the first switch, the third switch, the sixth switch, and the eighth switch.

10. The method of 8, wherein coupling the first capacitor and the second capacitor in parallel between the input of the buck converter and the node comprises:
    closing the first switch, the third switch, the fifth switch, and the seventh switch; and
    opening the second switch, the fourth switch, the sixth switch, and the eighth switch.

11. The method of 10, wherein coupling the first capacitor and the second capacitor in parallel between the node and ground comprises:
    opening the first switch, the third switch, the fifth switch, and the seventh switch; and
    closing the second switch, the fourth switch, the sixth switch, and the eighth switch.

12. An apparatus, comprising:
    a buck converter, wherein the buck converter includes:
        a first capacitor;
        a first switching network configured to couple the first capacitor between an input of the buck converter and a node in response to a first set of control values, and to couple the first capacitor between the node and a ground in response to a second set of control values;
        a second capacitor;
        a second switching network configured to couple the second capacitor between the input of the buck converter and the node in response to a third set of control values, and to couple the second capacitor between the node and the ground in response to a fourth set of control values; and an inductor coupled between the node and an output of the buck converter; and a controller, wherein, during a first portion of a first cycle, the controller is configured to input the first set of control values to the first switching network and input the fourth set of control values to the second switching network, during a second portion of the first cycle, the controller is configured to input the second set of control values to the first switching network and input the third set of control values to the second switching network, during a first portion of a second cycle, the controller is configured to input the first set of control signals to the first switching network and input the third set of control signals to the second switching network, and, during a second portion of the second cycle, the controller is configured to input the second set of control signals to the first switching network and input the fourth set of control signals to the second switching network.

13. The apparatus of claim 12, wherein:
the first switching network is configured to couple the node to the ground in response to a fifth set of control signals; and
during a third portion of the first cycle, the controller is configured to input the fifth set of control signals to the first switching network.

14. The apparatus of claim 13, wherein the third portion of the first cycle is between the first portion of the first cycle and the second portion of the first cycle.

15. The apparatus of claim 12, wherein:
the first switching network is configured to couple the node to the input of the buck converter in response to a fifth set of control signals; and
during a third portion of the first cycle, the controller is configured to input the fifth set of control signals to the first switching network.

16. The apparatus of claim 15, wherein the third portion of the first cycle is between the first portion of the first cycle and the second portion of the first cycle.

17. The apparatus of claim 12, wherein:
the first switching network includes:
a first switch and a second switch coupled in series between the input of the buck converter and the node; and
a third switch and a fourth switch coupled in series between the node and the ground;
a first terminal of the first capacitor is coupled between the first switch and the second switch;
a second terminal of the first capacitor is coupled between the third switch and the fourth switch;
in response to the first set of control signals, the first switch and the third switch close, and the second switch and the fourth switch open; and
in response to the second set of control signals, the first switch and the third switch open, and the second switch and the fourth switch close.

18. The apparatus of claim 17, wherein:
the second switching network includes:
a fifth switch and a sixth switch coupled in series between the input of the buck converter and the node; and
a seventh switch and an eighth switch coupled in series between the node and the ground;
a first terminal of the second capacitor is coupled between the fifth switch and the sixth switch;
a second terminal of the second capacitor is coupled between the seventh switch and the eighth switch;
in response to the third set of control signals, the fifth switch and the seventh switch close, and the sixth switch and the eighth switch open; and
in response to the fourth set of control signals, the fifth switch and the seventh switch open, and the sixth switch and the eighth switch close.

19. The apparatus of claim 12, further comprising:
a charger;
a power transistor coupled between the charger and the input of the buck converter; and
a battery coupled to the output of the buck converter.

20. The apparatus of claim 12, wherein the first set of control values is the same as the third set of control values, and the second set of control values is the same as the fourth set of control values.

* * * * *